United States Patent
Tsujita et al.

(10) Patent No.: US 9,488,500 B2
(45) Date of Patent: Nov. 8, 2016

(54) POSITION MEASURMENT APPARATUS FOR MEASURING POSITION OF MOBILE OBJECT ON THE BASIS OF REFELECTED WAVE

(75) Inventors: Wataru Tsujita, Tokyo (JP); Kenji Inomata, Tokyo (JP); Masahiro Watanabe, Tokyo (JP); Masahiro Shikai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 203 days.

(21) Appl. No.: 14/111,012

(22) PCT Filed: Apr. 18, 2011

(86) PCT No.: PCT/JP2011/059516
§ 371 (c)(1),
(2), (4) Date: Oct. 10, 2013

(87) PCT Pub. No.: WO2012/143988
PCT Pub. Date: Oct. 26, 2012

(65) Prior Publication Data
US 2014/0036265 A1    Feb. 6, 2014

(51) Int. Cl.
G01J 4/00 (2006.01)
G01S 13/00 (2006.01)
G01D 5/34 (2006.01)

(52) U.S. Cl.
CPC .................................. G01D 5/345 (2013.01)

(58) Field of Classification Search
CPC .............................. G01D 5/345; G01D 5/347
USPC .............................. 356/364; 342/27–28, 188
See application file for complete search history.

(56) References Cited

U.S. PATENT DOCUMENTS 3,311,915 A * 3/1967 Mori ....................... B61L 25/04
                                                      342/188
RE26,292 E * 10/1967 Bradford ................. B61L 25/04
                                                      342/188

(Continued)

FOREIGN PATENT DOCUMENTS

JP          57 84411          5/1982
JP        10 103963          4/1998

(Continued)

OTHER PUBLICATIONS

International Search Report Issued May 17, 2011 in PCT/JP11/059516 Filed Apr. 18, 2011.

(Continued)

Primary Examiner — Tarifur Chowdhury
Assistant Examiner — Sunghee Y Gray
(74) Attorney, Agent, or Firm — Oblon, McClelland, Maier & Neustadt, L.L.P.

(57) ABSTRACT

A reflector apparatus includes reflectors, which respectively radiate reflected waves in predetermined polarization directions. A polarized wave information reading circuit fixed to a moving body radiates a radio wave toward the reflecting apparatus from a transmitting antenna, receives reflected waves from the reflecting apparatus, and generates a received level difference signal that corresponds to a polarization direction of the received reflected waves. A position calculating circuit calculates a position of the polarized wave information reading circuit based on the received level difference signal.

12 Claims, 14 Drawing Sheets

(56) References Cited

U.S. PATENT DOCUMENTS

| | | | |
|---|---|---|---|
| 5,815,269 A | 9/1998 | Crabb et al. | |
| 2003/0095257 A1 | 5/2003 | Wijntjes et al. | |
| 2008/0030394 A1* | 2/2008 | Yoshida | G01S 13/931 342/74 |
| 2010/0026562 A1 | 2/2010 | Hyodo et al. | |
| 2011/0285593 A1* | 11/2011 | Cavirani | G01S 7/024 342/457 |

FOREIGN PATENT DOCUMENTS

| | | |
|---|---|---|
| JP | 11 328575 | 11/1999 |
| JP | 2000 88954 | 3/2000 |
| JP | 2007 326514 | 12/2007 |
| JP | 2010 38607 | 2/2010 |
| JP | 2011 64546 | 3/2011 |

OTHER PUBLICATIONS

International Preliminary Report on Patentability and Written Opinion issued Oct. 31, 2013 in PCT/JP2011/059516 (submitting English language translation only).

* cited by examiner

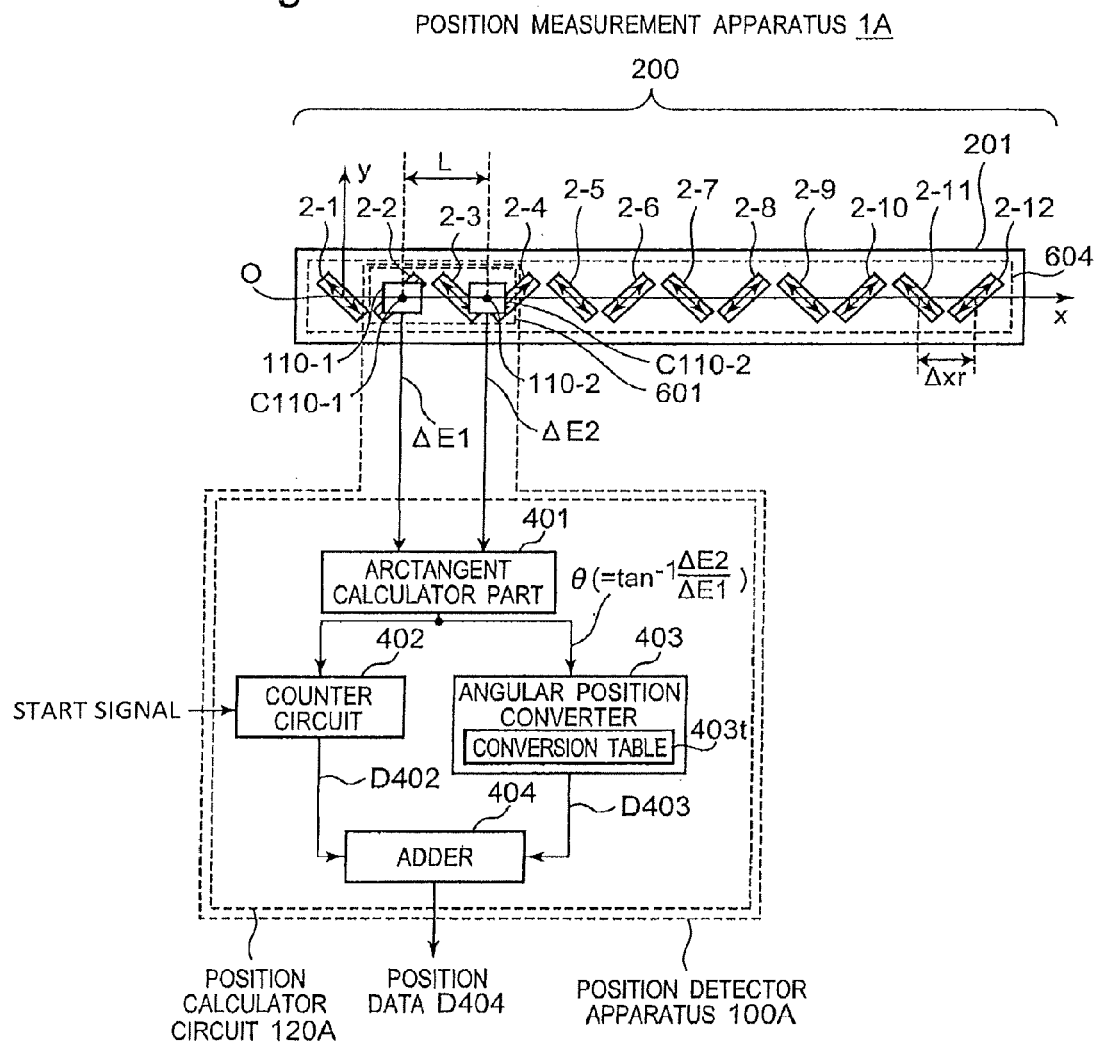

Fig.14 POSITION MEASUREMENT APPARATUS 1D

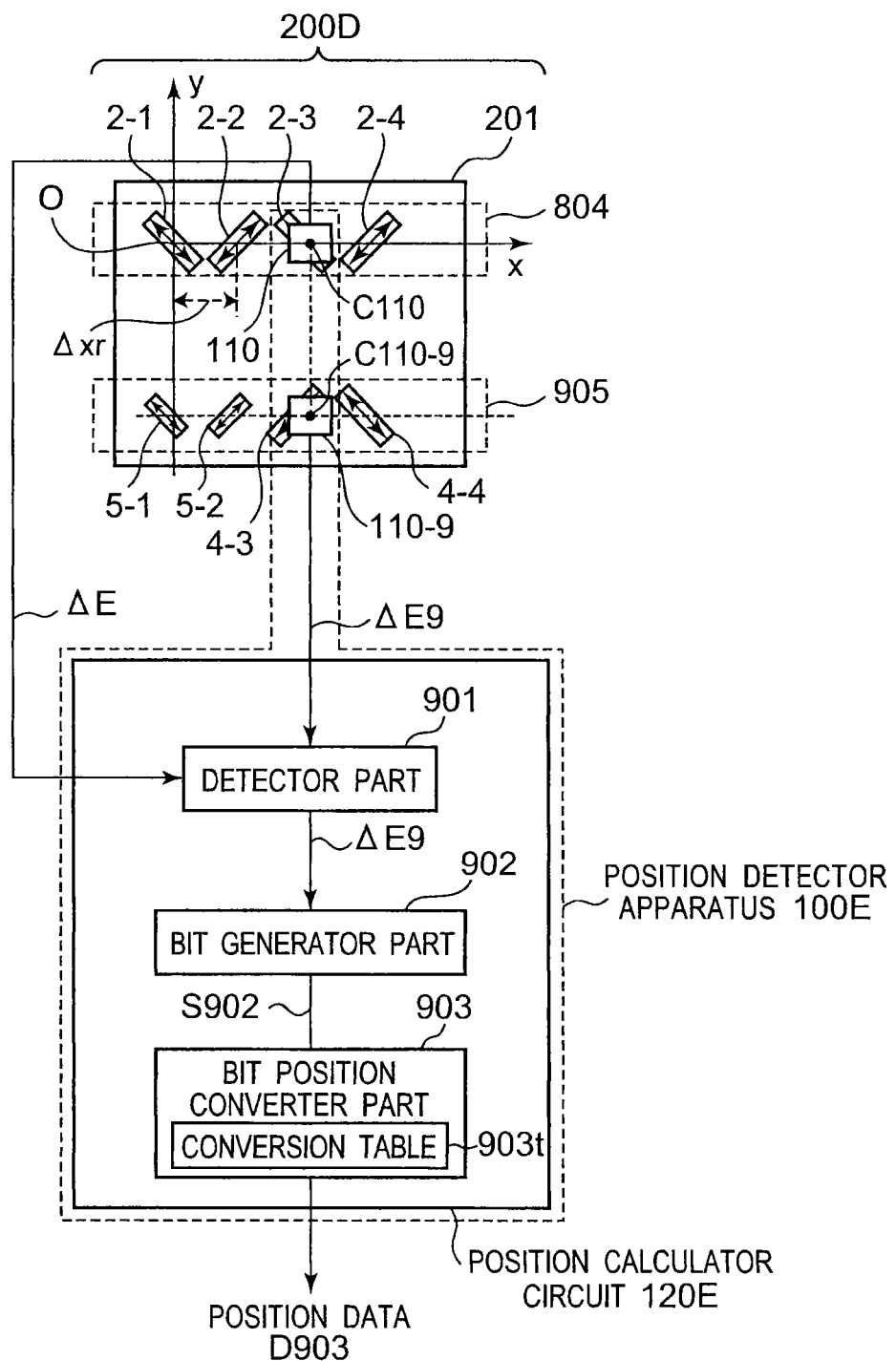

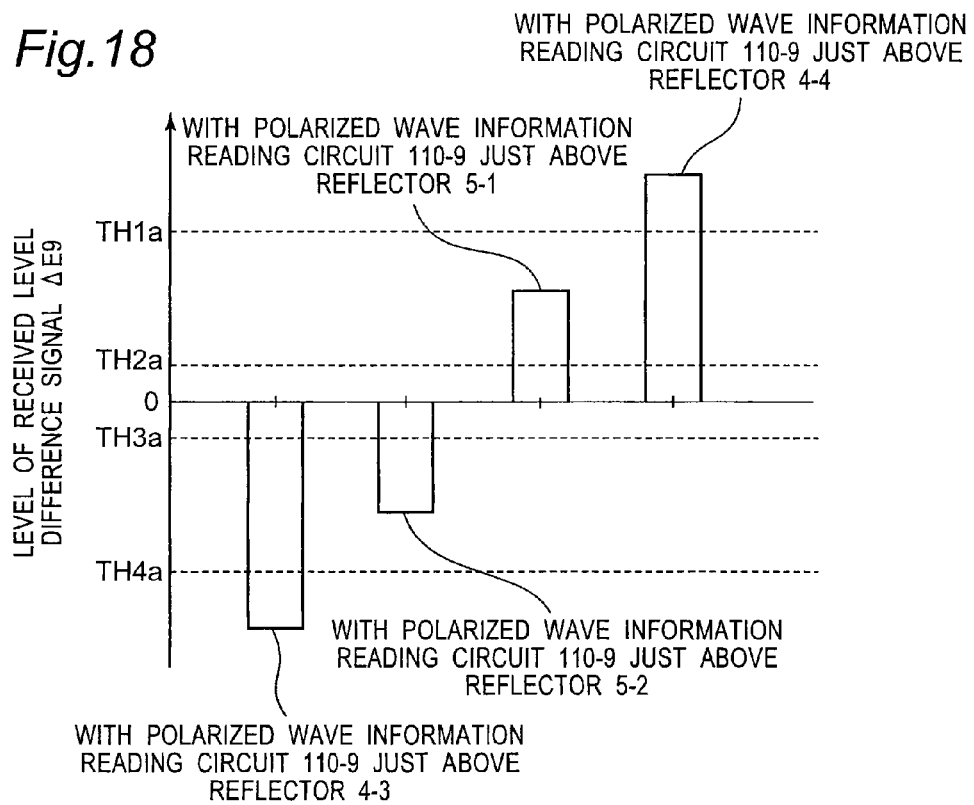
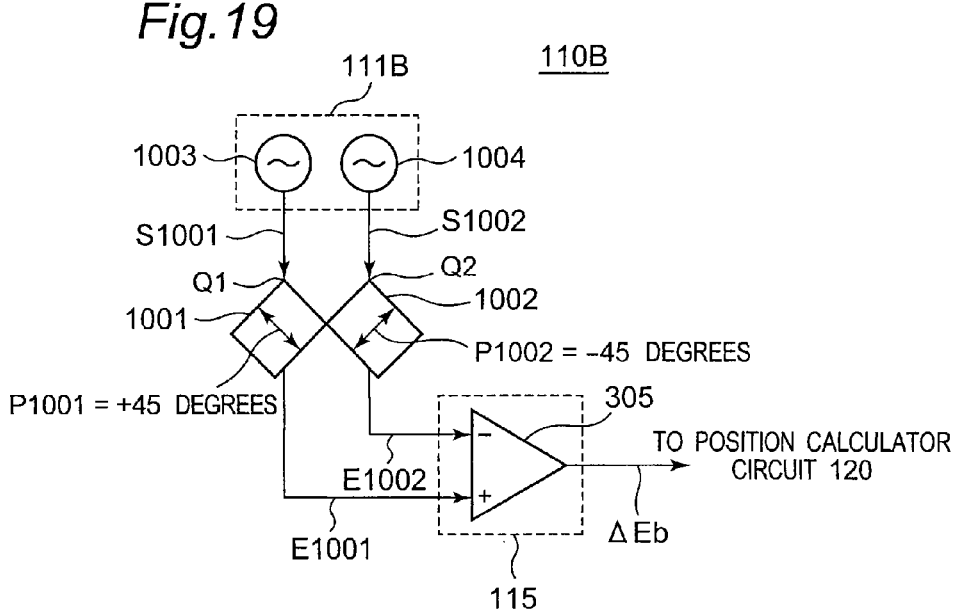

POSITION MEASURMENT APPARATUS FOR MEASURING POSITION OF MOBILE OBJECT ON THE BASIS OF REFELECTED WAVE

TECHNICAL FIELD

The present invention relates to a mobile object position measurement apparatus, and in particular, to a position measurement apparatus configured to measure a position of a mobile object such as a train on a railroad or a cage of an elevating machine (elevator).

BACKGROUND ART

A prior art linear encoder includes a scale fixed to a fixed body, and a head fixed to a mobile object that moves relatively to the fixed body to read the positional information of the head with respect to the scale by using the head and detect the position of the mobile object. For example, an optical linear encoder includes a head having a light-emitting device and a light-receiving device, and a scale having a grid scale to reflect light from the light-emitting device by the grid scale of the scale, receive reflected light by the light-receiving device and detect the position of the head, on the basis of a change in the quantity of light of the reflected light. Moreover, for example, a magnetic linear encoder includes a head having a magnetoresistive device, and a scale having a plurality of magnets alternately arranged so that mutually adjoining magnets have mutually reverse polarities to measure a change in the magnetic field corresponding to the scale provided respectively in correspondence with the north pole and the south pole of each magnet and detect the position of the head.

In general, these linear encoders need to have a gap between the head and the scale set to about 1 mm or less. When the gap is set to several centimeters or more in an optical encoder, the light irradiation point grows dim or the quantity of light of the reflected light becomes small, and this leads to decrease in the signal-to-noise ratio of the signal. Accordingly, there is a such problem that the position measurement error becomes large, and the measurement becomes impossible in the worst case. Further, there is such a problem that the positioning becomes impossible under the influence of dust and dirt and turbulence light. Moreover, there is a such problem that a strong magnet needs to be used in order to measure changes in the magnetic field when the gap is set to be equal to or larger than several centimeters in the magnetic encoder, and this leads to an increase in the cost of the scale. Moreover, there is such a problem that measurement becomes impossible under the influence of magnetic materials existing around the magnetic encoder.

There has been a demand for highly accurately detecting the train position in order to perform train operation control with high accuracy in the field of railroad, and a demand for highly accurately detecting the cage position in order to perform cage control with high accuracy in the field of elevator. When a linear encoder is used for railroad train position detection, the gap between the head and the scale needs to be 10 cm to 40 cm. Moreover, when a linear encoder is used for elevator cage position detection, the gap between the head and the scale needs to be several centimeters.

However, in the prior art optical or magnetic linear encoder, there are many problems upon widely setting the gap between the head and the scale to several centimeters or more as described above, and it is difficult to apply these linear encoders directly to the railroad train position detection and the elevator cage position detection.

In order to solve these problems, the Patent Document 1 discloses a detector apparatus, which includes a head that is fixed to a mobile object and transmits and receives radio waves, and a scale that changes the intensity of reflection of radio waves fixed to a fixed body to detect the position by detecting a change in the reflection intensity of radio waves in the head. Since the radio waves are used in the detector apparatus of the Patent Document 1, the position of the mobile object can be detected without receiving the influences of dust and dirt, turbulence light and magnetic materials existing around the detector apparatus. Moreover, since the change in the reflection intensity of radio waves only needs to be able to be detected, the gap between the head and the scale can be set widely by comparison to the prior art.

PRIOR ART DOCUMENTS

Patent Document

Patent Documents 1: Japanese patent laid-open publication No. JP2010-38607A

SUMMARY OF THE INVENTION

Problems to be Dissolved by the Invention

However, the detector apparatus of the Patent Document 1, which performs position detection by utilizing the reflection intensity of radio waves, therefore has such a problem that the detection of a change in the reflection intensity becomes difficult when there are many reflective objects such as metals around the detector apparatus, and the position detection becomes impossible. Further, since a loss due to the propagation of radio waves changes depending on a change in the distance between the head and the scale when the mobile object vibrates, the received reflection intensity changes in the detector apparatus of the Patent Document 1. Accordingly, there is such a problem that it is impossible to distinguish whether the change in the reflection intensity is caused due to the scale or the vibration of the mobile object, and the position detection becomes impossible. Further, there is such a problem that the reflection intensity changes due to a phase interference due to multipath reflection of radio waves between the head and the scale, and the position detection becomes impossible in the detector apparatus of the Patent Document 1.

An object of the present invention is to solve the aforementioned problems and provide a position measurement apparatus capable of setting large a distance between a mobile object and a fixed body by comparison to the prior art. Moreover, a second object of the present invention is to solve the aforementioned problems and provide a position measurement apparatus capable of detecting the position of the mobile object even if there are reflective objects, magnetic materials, the vibrations of mobile objects, and phase interference due to multipath reflection of radio waves between the mobile object and fixed bodies.

Means for Dissolving the Problems

According to the invention, there is provided a position measurement apparatus including reflecting means, and position detecting means. The reflecting means includes a plurality of reflectors, that are configured to be arranged at a predetermined reflector interval along a predetermined transfer pathway of a mobile object, and to radiate radio waves by reflecting reflected waves in respective predetermined polarization directions when predetermined radio waves are incident thereon. The position detecting means is configured to detect a position of the mobile object in the transfer pathway. The position detecting means includes at least one polarized wave information reading means, and position calculating means. At least one polarized wave information reading means is configured to radiate the radio waves from the mobile object toward the reflecting means, receive a reflected wave from the reflecting means, and generate a polarization state signal corresponding to the polarization direction of the received reflected wave. The position calculating means is configured to calculate the position of the mobile object on the transfer pathway, on the basis of at least one polarization state signal from at least one of the polarized wave information reading means.

Effects of the Invention

According to the position measurement apparatus of the present invention, which uses radio waves, is therefore able to measure the relative position of the mobile object such as a railroad train and an elevator cage without receiving the influences of dust and dirt and environmental changes such as turbulence light. Moreover, an interval between the position detecting means and the reflecting means only needs to be a half of the reflector interval. Therefore, when the reflector interval is set to 30 cm, the interval between the position detecting means and the reflecting means can be set to 10 cm, and the position of the mobile object such as a railroad train and an elevator cage can be measured. Furthermore, since the position of the position detecting means is measured on the basis of not the reflection intensity of reflected waves but the polarization direction of the reflected waves. Therefore, a change in the polarization state signal corresponding to a change in the polarization direction of the reflected waves can be detected without receiving the influences of the metal objects around the position measurement apparatus, the vibrations of the mobile object, and the phase interference due to multipath reflection, and the position of the mobile object such as a train and an elevator cage can be measured more accurately by comparison to the prior art.

BRIEF DESCRIPTION OF DRAWINGS

FIG. 8 is a block diagram showing a configuration of a position measurement apparatus 1A according to a second embodiment of the present invention;

FIG. 17 is a block diagram showing a configuration of a position measurement apparatus 1E according to a seventh embodiment of the present invention;

FIG. 18 is a bar graph showing each received level difference signal $\Delta E9$ when the polarized wave information reading circuit 110-9 of FIG. 17 is located just above a reflector 5-1, 5-2, 4-3 or 4-4; and FIG. 19 is a block diagram showing a configuration of a polarized wave information reading circuit 110B according to an eighth embodiment of the present invention.

BEST MODE FOR CARRYING OUT THE INVENTION

Figure 1:
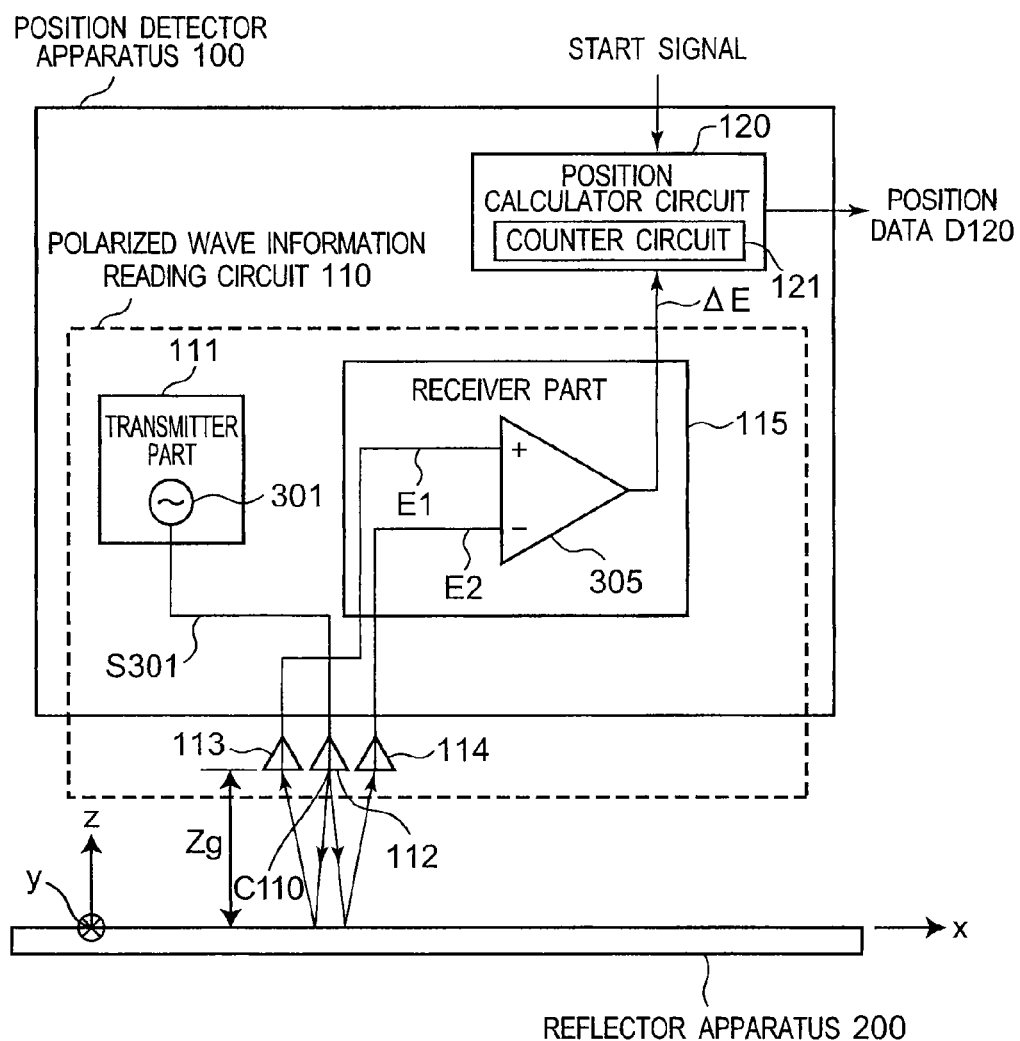
FIG. 1 is a block diagram showing a configuration of a position measurement apparatus 1 according to a first embodiment of the present invention.
Figure 2:
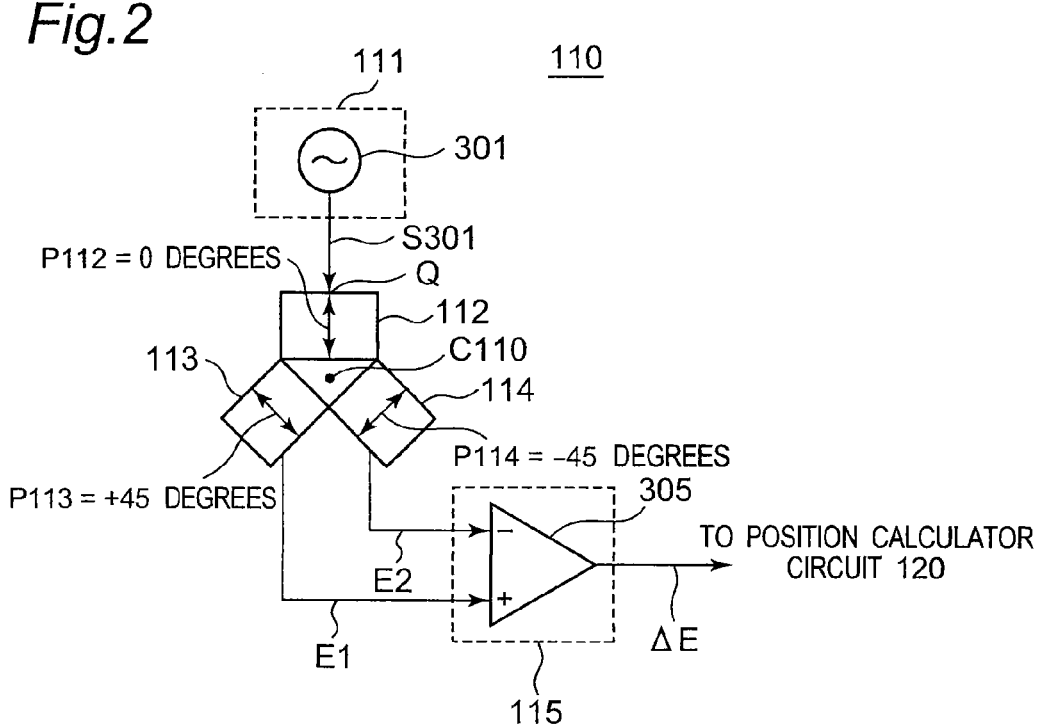
FIG. 2 is a block diagram showing a configuration of a polarized wave information reading circuit 110 of FIG. 1.
Figure 3:
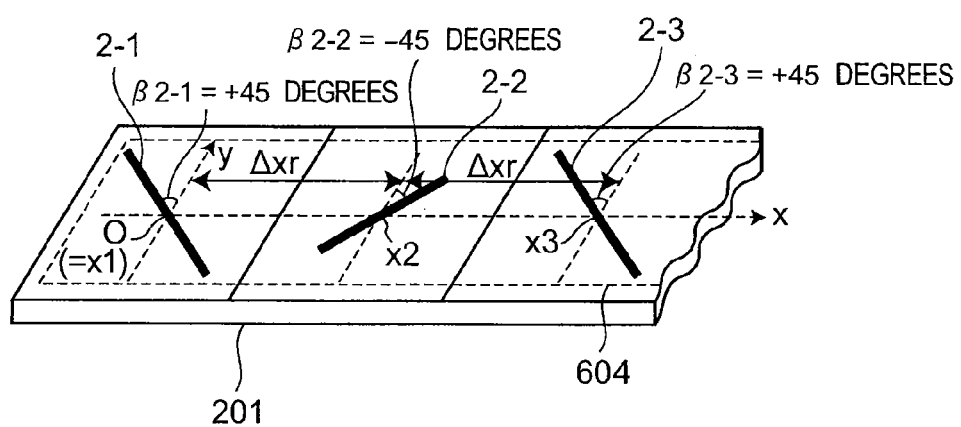
FIG. 3 is a perspective view of a part of a reflector apparatus 200 of FIG. 1.

Embodiments of the present invention will be described below with reference to the drawings. It is noted that like components are denoted by like reference numerals.
First Embodiment FIG. 1 is a block diagram showing a configuration of a position measurement apparatus 1 according to the first embodiment of the present invention. FIG. 2 is a block diagram showing a configuration of the polarized wave information reading circuit 110 of FIG. 1. FIG. 3 is a partial perspective view of the reflector apparatus 200 of FIG. 1. Referring to FIG. 1, the position measurement apparatus 1, which is a radio wave type encoder apparatus, is configured to include a position detector apparatus 100 and a reflector apparatus 200. In this case, the reflector apparatus 200 is fixed to a fixed body such as a railroad track or an elevator wall, while the position detector apparatus 100 is fixed to a mobile object such as a train and an elevator cage. Moreover, the polarized wave information reading circuit 110 and the reflector apparatus 200 correspond to the head and the scale, respectively, in the linear encoder apparatus. The position measurement apparatus 1 is used for detecting the position of the mobile object on the transfer pathway.

As described in detail later, the position measurement apparatus 1 of the present embodiment is characterized in that reflectors 2-1 to 2-12 of the reflector apparatus 200 are provided so that the polarization directions of reflected waves from a pair of reflectors adjacent each other are different from each other, and the position detector apparatus 100 includes one polarized wave information reading circuit 110 and calculates the relative position of the mobile object on the transfer pathway with respect to a predetermined reference position, on the basis of a change in the received level difference signal ΔE from the polarized wave information reading circuit 110. It is noted that the transfer pathway of the mobile object is a straight line along the x axis of FIG. 1 in the present embodiment.

Referring to FIG. 3, the reflector apparatus 200 is configured to include a rectangular resin plate 201 and a reflector group 604 arranged along the transfer pathway of the mobile object. Moreover, the reflector group 604 is configured to include the reflectors 2-1 to 2-12. The reflectors 2-1 to 2-12 (See FIG. 6) are, for example, metal bars having the same shape and are formed of an identical material (i.e., having a mutually identical reflectance). In this case, as shown in FIG. 3, the center of the reflector 2-1 is defined as an origin O of a right-handed xyz coordinate system, an upward direction with respect to the origin O is defined as the positive direction of the z axis, and the lengthwise direction of the resin plate 201 is defined as the x-axis direction. Referring to FIG. 3, the reflectors 2-1 to 2-12 are embedded in the surface of the resin plate 201 so that the centers of the reflectors 2-1 to 2-12 are arranged at a reflector interval Δxr at coordinate positions (x1, 0, 0), (x2, 0, 0), ..., (x12, 0, 0). Moreover, the angles β2-1, β2-3, ..., β2-11 between the lengthwise directions of the odd-numbered reflectors 2-1, 2-3, ..., 2-11 and the y axis are each set to +45 degrees, while the angles β2-2, β2-4, ..., β2-12 between the lengthwise directions of the even-numbered reflectors 2-2, 2-4, ..., 2-12 and the y axis are each set to −45 degrees (where the counterclockwise direction from the y axis is defined as the positive direction of the angles β2-1 to β2-12). In general, when radio waves are incident on a metal bar, the metal bar reflects the incident radio waves by changing the polarization direction of the radio waves into the longitudinal direction of the metal bar, and radiates linearly polarized radio waves having a polarization direction in the lengthwise direction of the metal bar. Therefore, the odd-numbered reflectors 2-1, 2-3, ..., 2-11 radiate linearly polarized radio waves having polarization directions that makes an angle of +45 degrees between them and the y axis, and the even-numbered reflectors 2-2, 2-4, ..., 2-12 radiate linearly polarized radio waves having a polarization direction that makes an angle of −45 degrees between them and the y axis.

Referring to FIG. 1, the position detector apparatus 100 is configured to include the polarized wave information reading circuit 110 and a position calculator circuit 120 including a counter circuit 121. Moreover, referring to FIG. 2, the polarized wave information reading circuit 110 is configured to include a transmitter part 111 having an oscillator 301, a transmitting antenna 112, a receiving antenna 113, a receiving antenna 114, and a receiver part 115 includes a received level difference calculator 305. As shown in FIGS. 1 and 2, the transmitting antenna 112, the receiving antenna 113 and the receiving antenna 114 are rectangular patch antennas, which are provided at respective positions at a height of Zg parallel to the resin plate 201 so as to transmit or receive linearly polarized radio waves. In FIG. 2, a polarization direction P112 of radio waves radiated from the transmitting antenna 112 is set to zero degrees, a polarization direction P113 of radio waves received by the receiving antenna 113 is set to +45 degrees, and a polarization direction P114 of radio waves received by the receiving antenna 114 is set to −45 degrees. In this case, the center of each of the antennas 112, 113 and 114 is defined as a center C110. In FIG. 1, the position detector apparatus 100 is configured so that the center C110 moves on a line segment from a coordinate position (0, 0, Zg) just above the reflector 2-1 to a coordinate position (x12, 0, Zg) just above the reflector 2-12.

Referring to FIG. 2, the oscillator 301 generates an oscillation signal S301 having a predetermined frequency, and outputs the oscillation signal S301 to the feeding point Q of the transmitting antenna 112. The transmitting antenna 112 radiates the oscillation signal S301 as linearly polarized radio waves having a polarization direction P112. The radiated radio waves are reflected at a reflecting point on the reflector apparatus 200, and thereafter received by the receiving antennas 113 and 114. In this case, the receiving antenna 113 receives radio waves that are reflected by the reflector apparatus 200 after being radiated from the transmitting antenna 112 and has a polarization direction P113, and outputs the radio waves as a received signal E1 to the non-inverted input terminal of the received level difference calculator 305. On the other hand, the receiving antenna 114 receives radio waves that are reflected by the reflector apparatus 200 after being radiated from the transmitting antenna 112 and has a polarization direction P114, and outputs the radio waves as a received signal E2 to the inverted input terminal of the received level difference calculator 305. In this case, the reflecting point on the reflector apparatus 200 of the radio waves received by the receiving antenna 113 and the reflecting point on the reflector apparatus 200 of the radio waves received by the receiving antenna 114 are the positions at which the centers C110 of the antennas 112 to 114 are substantially projected on the resin plate 201. It is noted that the radio waves from the aforementioned reflecting point are dominant in the radio waves received by the receiving antennas 113 and 114. However, since the radio waves from the transmitting antenna 112 reach the reflector apparatus 200 with spreading within a range of a predetermined radiation angle, the radio waves include radio waves other than from the aforementioned reflecting points.

Moreover, referring to FIG. 2, an output signal from the received level difference calculator 305 is outputted as a received level difference signal ΔE to the position calculator circuit 120. In this case, the received level difference signal ΔE is a polarization state signal corresponding to the polarization direction of the reflected wave. The position calculator circuit 120 calculates the x-coordinate (hereinafter, referred to as the position of the position detector apparatus 100) at the centers C110 of the antennas 112 to 114 as described in detail later, on the basis of the received level difference signal ΔE.

Figure 4:
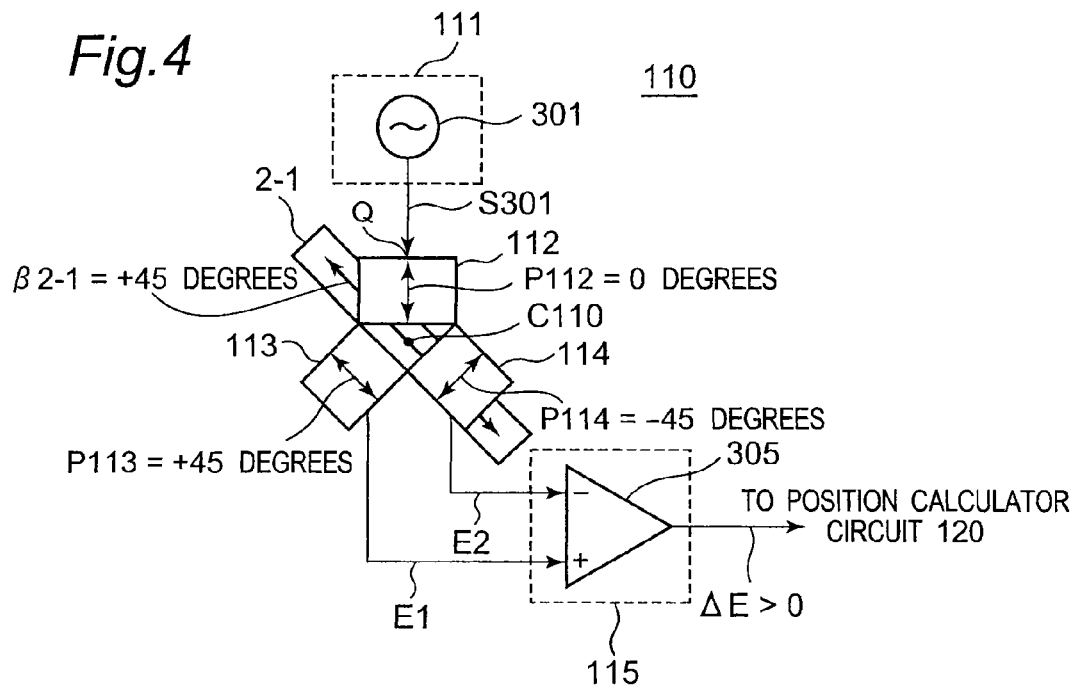
FIG. 4 is a block diagram showing a polarized wave information reading circuit 110 and a reflector 2-1 when a center C110 of the polarized wave information reading circuit 110 of FIG. 1 is located just above a reflector 2-1.

FIG. 4 is a block diagram showing a polarized wave information reading circuit 110 and the reflector 2-1 when the center C110 of the polarized wave information reading circuit 110 of FIG. 1 is located just above the reflector 2-1. Referring to FIG. 4, the angle β2-1 between the lengthwise direction of the reflector 2-1 and the y axis is +45 degrees, and coincides with the polarization direction P113 of the radio waves received by the receiving antenna 113. Therefore, the received level of the received signal E1 is maximized, and the received level of the received signal E2 is minimized. Moreover, the value of the received level difference signal ΔE outputted from the received level difference calculator 305 becomes a positive maximum value.

Figure 5:
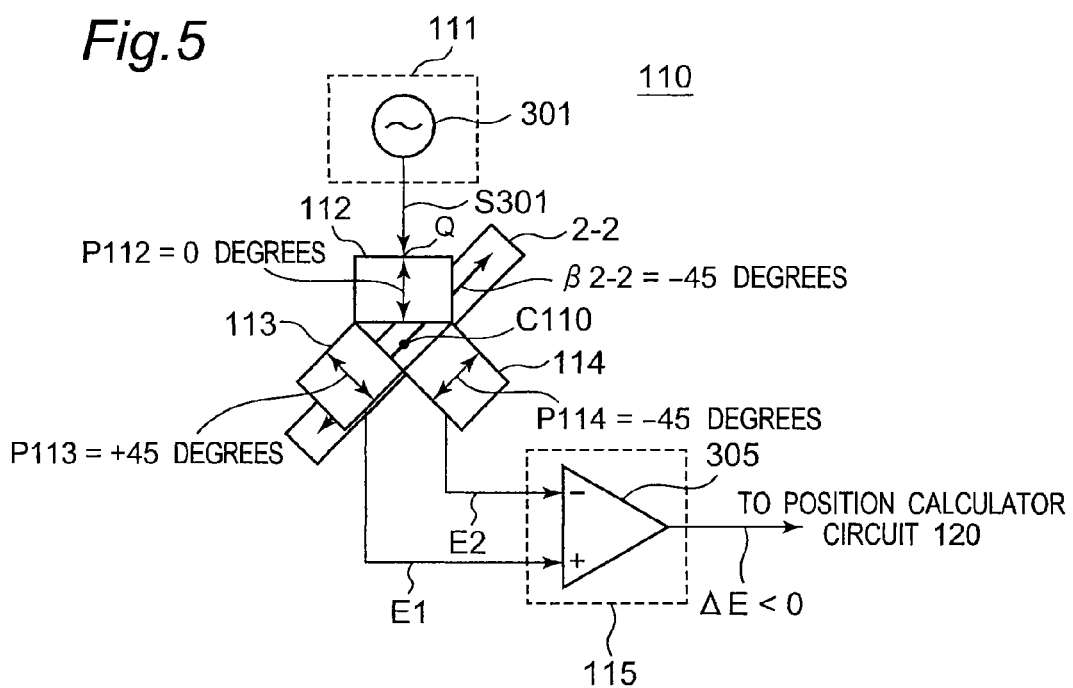
FIG. 5 is a block diagram showing a polarized wave information reading circuit 110 and the reflector 2-1 when the center C110 of the polarized wave information reading circuit 110 of FIG. 1 is located just above the reflector 2-1.

FIG. 5 is a block diagram showing a polarized wave information reading circuit 110 and the reflector 2-2 when the center C110 of the polarized wave information reading circuit 110 of FIG. 1 is located just above the reflector 2-2. Referring to FIG. 5, the angle β2-2 between the lengthwise direction of the reflector 2-2 and the y axis is −45 degrees, and coincides with the polarization direction P114 of the radio waves received by the receiving antenna 114. Therefore, the received level of the received signal E1 is minimized, and the received level of the received signal E2 is maximized. Moreover, the value of the received level difference signal ΔE outputted from the received level difference calculator 305 becomes a negative minimum value.

Figure 6:
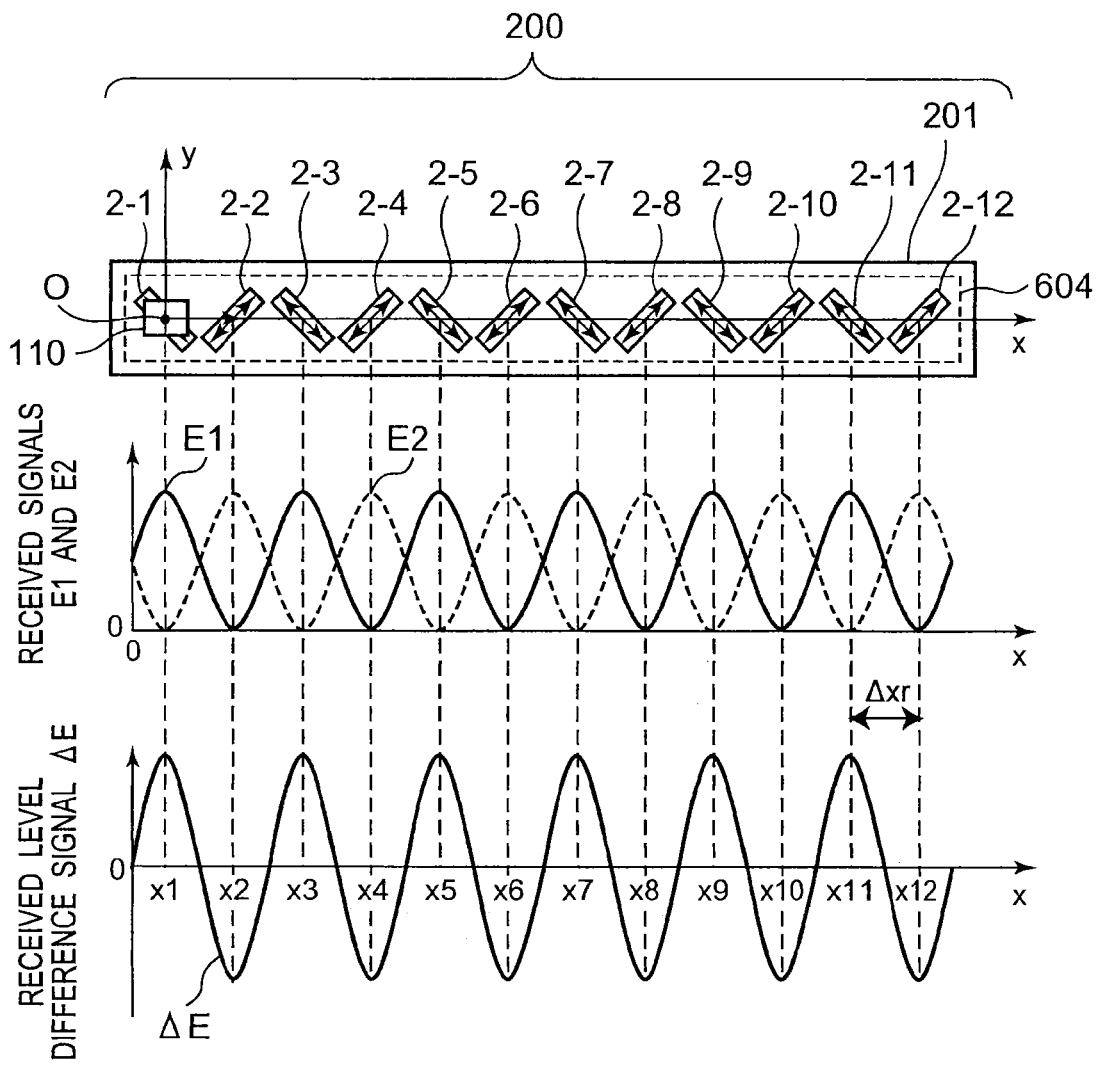
FIG. 6 is a plan view of a reflector apparatus 200 of FIG. 1, a graph of received levels E1 and E2 when the polarized wave information reading circuit 110 of FIG. 1 moved from an origin O in a positive x-axis direction, and a graph of a received level difference signal $\Delta E$.

FIG. 6 is a plan view of the reflector apparatus 200 of FIG. 1, a graph of the received levels E1 and E2 when the polarized wave information reading circuit 110 of FIG. 1 moved from the origin O in the positive x-axis direction, and a graph of the received level difference signal ΔE. Referring to FIG. 6, the received signal E1 is a sinusoidal wave having a period 2Δxr that is two times the reflector interval Δxr. Moreover, the received signal E2 is a sinusoidal wave in anti-phase to the received signal E1. Further, the received level difference signal ΔE is a sinusoidal wave having a period 2Δxr that is two times the reflector interval Δxr.

Referring to FIG. 1, the position calculator circuit 120 is configured to include the counter circuit 121. The counter circuit 121 resets the count value upon receiving a predetermined start signal that instructs start of position detection of the position detector apparatus 100 from an external apparatus of the position measurement apparatus 1, and counts the frequency of zero cross of the inputted received level difference signal ΔE. The position calculator circuit 120 calculates the relative position of the position detector apparatus 100 with respect to the position (reference position) of the position detector apparatus 100 when a start signal is inputted by multiplying the count value of the counter circuit 121 by the reflector interval Δxr, and outputs the resultant as position data D120.

Next, a setting method of the height Zg (hereinafter, referred to as an interval Zg between the position detector apparatus 100 and the reflector apparatus 200) of the antennas 112 to 114 is described.

Figure 7A:
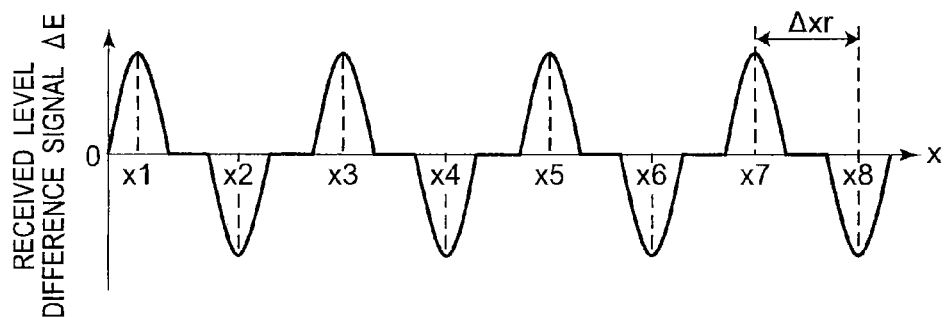
FIG. 7A is a graph of the received level difference signal $\Delta E$ with respect to the x-coordinate of the position of the polarized wave information reading circuit 110 when an interval Zg between the position detector apparatus 100 and the reflector apparatus 200 is sufficiently smaller than a half of a reflector interval $\Delta xr$ in the position measurement apparatus 1 of FIG. 1.

FIG. 7A is a graph of the received level difference signal ΔE with respect to the x-coordinate of the position of the polarized wave information reading circuit 110 when the interval Zg between the position detector apparatus 100 and the reflector apparatus 200 is sufficiently smaller than a half of the reflector interval Δxr in the position measurement apparatus 1 of FIG. 1. In this case, as shown in FIG. 7A, the slope of the received level difference signal ΔE becomes very small when the position detector apparatus 100 is located between a pair of reflectors of the reflectors 2-1 to 2-12 which are adjacent to each other, and therefore, it is difficult to detect the zero cross point of the received level difference signal ΔE by the counter circuit 121. Therefore, it is difficult to detect the position of the position detector apparatus 100.

Figure 7B:
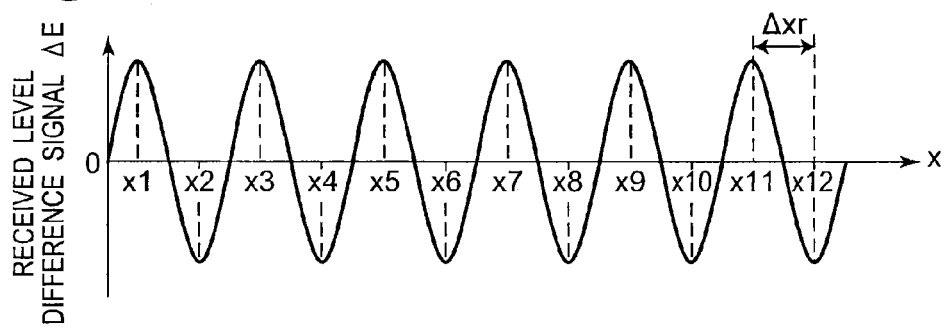
FIG. 7B is a graph of the received level difference signal $\Delta E$ with respect to the x-coordinate of the position of the polarized wave information reading circuit 110 when the interval Zg between the position detector apparatus 100 and the reflector apparatus 200 is sufficiently smaller than the wavelength $\lambda$ of radio waves radiated from a transmitting antenna 112 and the reflector interval $\Delta xr$ is equal to or smaller than a half of the wavelength $\lambda$ in the position measurement apparatus 1 of FIG. 1.

FIG. 7B is a graph of the received level difference signal ΔE with respect to the x-coordinate of the position of the polarized wave information reading circuit 110 when the interval Zg between the position detector apparatus 100 and the reflector apparatus 200 is sufficiently smaller than the wavelength λ of radio waves radiated from the transmitting antenna 112 and the reflector interval Δxr is equal to or smaller than a half of the wavelength λ in the position measurement apparatus 1 of FIG. 1. In this case, as shown in FIG. 7B, the received level difference signal ΔE becomes a sinusoidal wave that zero-crosses in each position in the middle of a pair of reflectors of the reflectors 2-1 to 2-12 which are adjacent to each other, and therefore, the position of the position detector apparatus 100 can be calculated on the basis of the count value from the counter circuit 121.

Figure 7C:
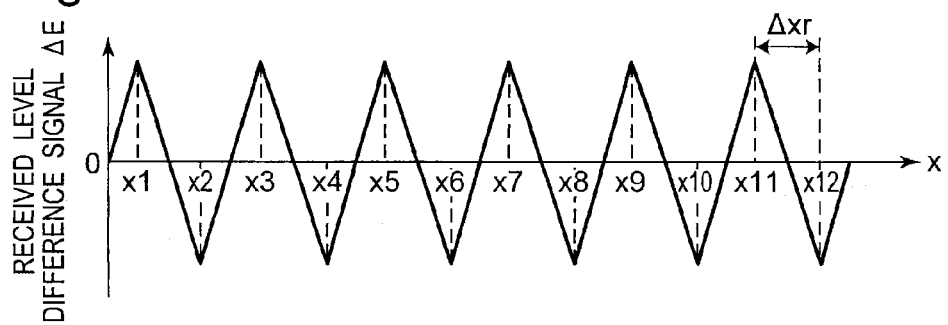
FIG. 7C is a graph of the received level difference signal $\Delta E$ with respect to the x-coordinate of the position of the polarized wave information reading circuit 110 when the interval Zg between the position detector apparatus 100 and the reflector apparatus 200 is a half of the reflector interval $\Delta xr$ in the position measurement apparatus 1 of FIG. 1.

FIG. 7C is a graph of the received level difference signal ΔE with respect to the x-coordinate of the position of the polarized wave information reading circuit 110 when the interval Zg between the position detector apparatus 100 and the reflector apparatus 200 is a half of the reflector interval Δxr in the position measurement apparatus 1 of FIG. 1. When the interval Zg between the position detector apparatus 100 and the reflector apparatus 200 is a half of the reflector interval Δxr, the received level difference signal ΔE comes to have a sine-wave-like waveform that zero-crosses in each position in the middle of a pair of reflectors of the reflectors 2-1 to 2-12 which are adjacent each other, without depending on the wavelength λ of the radio waves radiated from the transmitting antenna 112. Therefore, the position of the position detector apparatus 100 can be calculated on the basis of the count value from the counter circuit 121.

Figure 7D:
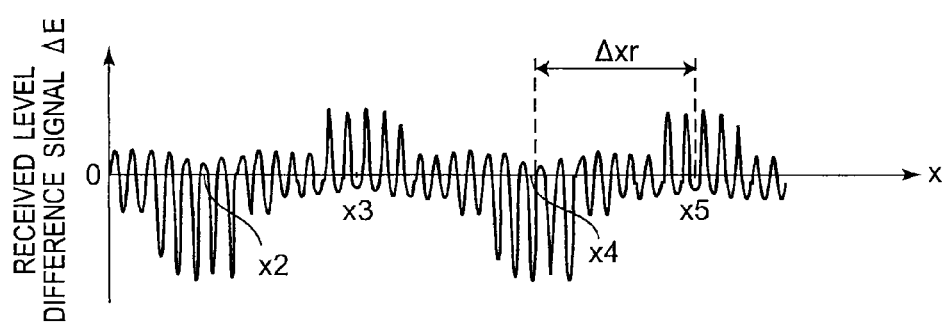
FIG. 7D is a graph of the received level difference signal $\Delta E$ with respect to the x-coordinate of the position of the polarized wave information reading circuit 110 when the interval Zg between the position detector apparatus 100 and the reflector apparatus 200 is larger than the reflector interval $\Delta xr$ in the position measurement apparatus 1 of FIG. 1.

FIG. 7D is a graph of the received level difference signal ΔE with respect to the x-coordinate of the position of the polarized wave information reading circuit 110 when the interval Zg between the position detector apparatus 100 and the reflector apparatus 200 is larger than the reflector interval Δxr in the position measurement apparatus 1 of FIG. 1. In this case, a phase interference occurs, and the receiving antenna 113 and 114 disadvantageously receive reflected waves from not only the reflector 2-3 but also the peripheral reflectors 2-2 and 2-4 when, for example, the polarized wave information reading circuit 110 is located just above the reflector 2-3. Therefore, the position of the position detector apparatus 100 cannot be calculated on the basis of the count value from the counter circuit 121.

The conditions of the interval Zg between the position detector apparatus 100 and the reflector apparatus 200 in FIG. 7B is included in the conditions of the interval Zg between the position detector apparatus 100 and the reflector apparatus 200 in FIG. 7C. Therefore, according to FIGS. 7A to 7D, it can be understood that the interval Zg between the position detector apparatus 100 and the reflector apparatus 200 may be a half of the reflector interval Δxr regardless of the wavelength λ of the radio waves radiated from the transmitting antenna 112.

For example, in a case where the radio waves radiated from the transmitting antenna 112 are selected from microwaves, quasi-millimeter waves and millimeterwaves, when the position measurement apparatus 1 of FIG. 1 is used for measuring a railroad train position, it is preferable to set the reflector interval Δxr to, for example, 30 cm and set the interval Zg between the position detector apparatus 100 and the reflector apparatus 200 to a value equal to or larger than 10 cm and equal to or smaller than 20 cm. At this time, a position detection accuracy of 30 cm is obtained. Moreover, when the position measurement apparatus 1 of FIG. 1 is used for measuring the position of an elevator cage, it is preferable to set the reflector interval Δxr to, for example, 5 cm and to set the interval Zg between the position detector apparatus 100 and the reflector apparatus 200 to a value equal to or larger than 2 cm and equal to or smaller than 3 cm. In this case, a position detection accuracy of 5 cm is obtained.

Next, respective setting methods of the polarization directions P113 and P114, angles β2-1, β2-3, and 2-11 between the reflectors 2-1, 2-3, . . . , 2-11 and the y axis, angles β2-2, β2-4, . . . , β2-12 between the reflectors 2-2, 2-4, . . . , 2-12 and the y axis are described. In general, when radio waves are incident on an object and reflected, the polarization state of reflected waves change from the polarization state of the incident waves depending on the shape of the object. For example, when radio waves are incident on a metal bar like the reflectors 2-1 to 2-12, the linearly polarized radio waves that vibrate in the lengthwise direction of the metal bar are radiated as reflected waves. Therefore, the lengthwise direction of the metal bar can be detected on the basis of the polarization direction of the reflected waves. Moreover, when linearly polarized radio waves having a second polarization direction perpendicular to the polarization direction are incident on an antenna that receives the linearly polarized radio waves having a predetermined first polarization direction, the received level becomes theoretically zero. On the other hand, when the linearly polarized radio waves having the first polarization direction are incident on an antenna that receives linearly polarized radio waves having the first polarization direction, the received level become maximized. Therefore, by using the received signals E1 and E2 from one pair of receiving antennas 113 and 114 that receive radio waves having polarization directions P113 and P114, respectively, which pass through substantially an identical path and are perpendicular to each other, the magnitude of the received level difference signal ΔE can be maximized, and the signal-to-noise ratio of the received level difference signal ΔE can be maximized.

As described above, according to the present embodiment, since the radio waves are used, the relative position of the mobile object such as a train and an elevator cage can be measured without receiving the influences of dust and dirt and changes in the environment such as turbulence light. Moreover, since the interval Zg between the position detector apparatus 100 and the reflector apparatus 200 only may be a half of the reflector interval Δxr, the interval Zg between the position detector apparatus 100 and the reflector apparatus 200 can be set to several tens of centimeters when the reflector interval Δxr is set to 30 cm, and the relative position of the mobile object such as a train and an elevator cage can be measured. Further, since the position of the position detector apparatus 100 is measured on the basis of not the reflection intensity of the reflected waves but the polarization direction of the reflected waves, the change in the received level difference signal ΔE corresponding to the change in the polarization direction of the reflected waves can be detected without receiving the influences of peripheral metal objects of the position measurement apparatus 1 and the vibrations of the mobile object, and the relative position of the mobile object can be measured more accurately than that of the prior art.

Furthermore, since the position of the position detector apparatus 100 is measured on the basis of the polarization direction of the reflected waves, the change in the received level difference signal ΔE corresponding to the change in the polarization direction of the reflected waves can be detected even if the mobile object vibrates, and the relative position of the mobile object such as a train and an elevator cage, which intensely vibrates, can be measured more accurately than that of the prior art. Moreover, the change in the received level difference signal ΔE corresponding to the change in the polarization direction of the reflected waves can be detected even if there are phase interferences due to the multipath reflection of the radio waves between the position measurement apparatus 100 and the reflector apparatus 200. Even under the environments where many metal objects exist around the mobile object as on an iron bridge, inside a hoistway or the like, the relative position of the mobile object can be measured more accurately than that of the prior art.

Although the reflector apparatus 200 is configured to include the resin plate 201 and the reflectors 2-1 to 2-12 of metal bars in the present embodiment, the present invention is not limited to this. The reflectors 2-1 to 2-12 may radiate reflected waves by changing the polarization direction of the incident radio waves to a predetermined direction. For example, the reflectors 2-1 to 2-12 may each be an antenna element that reflects and radiates linearly polarized radio waves. Moreover, it is acceptable to alternately form a slit that makes an angle of 45 degrees with the y axis and a slit that makes an angle of −45 degrees with the y axis in a metal plate as the reflectors 2-1 to 2-12. Further, it is acceptable to stick conductor tapes such as an aluminum tape and a copper tape on the surface of the resin plate 201 as the reflectors 2-1 to 2-12.

Moreover, in order to maximize the signal-to-noise ratio of the received level difference signal ΔE, the present embodiment is configured so that the polarization direction P113 of radio waves received by the receiving antenna 113 and the polarization direction P114 of radio waves received by the receiving antenna 114 are perpendicular to each other, and the polarization direction of the reflected waves radiated from the reflectors 2-1, 2-3, . . . , 2-11 and the polarization direction of the reflected waves radiated from the reflectors 2-2, 2-4, . . . , 2-12 are perpendicular to each other. Further, it is configured so that the polarization direction P113 of the radio waves received by the receiving antenna 113 and the polarization direction of the reflected waves radiated from the reflectors 2-1, 2-3, . . . , 2-11 coincide with each other. However, the present invention is not limited to this, and the polarization direction P113 and the polarization direction P114 may be not perpendicular to each other. Moreover, the polarization directions P113 and P114 may not coincide with the polarization direction of the reflected waves radiated from the reflectors 2-1, 2-3, . . . , 2-11 or the polarization direction of the reflected waves radiated from the reflectors 2-2, 2-4, . . . , 2-12. For example, it is acceptable to set the polarization direction P113 to +30 degrees and set the polarization direction P114 to −30 degrees.

Further, although the transmitting antenna 112 radiates the linearly polarized radio waves having the polarization direction P112 of zero degrees in the present embodiment, the present invention is not limited to this, and the antenna may radiate radio waves in a predetermined polarization state such as circularly polarized waves. However, it is preferable that the radio waves from the transmitting antenna 112 are linearly polarized radio waves having a predetermined polarization direction perpendicular to the transfer pathway of the mobile object to which the position detector apparatus 100 fixed. In this case, it is preferable that each of the reflectors 2-1 to 2-12 reflects and radiates incident radio waves with the polarization direction changed from the aforementioned polarization direction of the linearly polarized radio waves by +45 degrees or −45 degrees.

Furthermore, although the position calculator circuit 120 calculates the position of the position detector apparatus 100 on the basis of the zero cross count value of the received level difference signal ΔE, the present invention is not limited to this. For example, the position calculator circuit 120 may calculate the position of the position detector apparatus 100 by generating bit data having a bit value of "1" when the received level difference signal ΔE is positive, and a bit value of "0" when the received level difference signal ΔE is negative on the basis of received level difference signal ΔE, counting the frequency of inversion of the bit data, and multiplying the count value of the count result by the reflector interval Δxr.

Moreover, although the entire position detector apparatus 100 is fixed to the mobile object in the present embodiment, the present invention is not limited to this, and it is proper to fix at least the antennas 112 to 114 of the position detector apparatus 100 to the mobile object, and provide a constant interval Zg between them and the reflecting apparatus 200.

Second Embodiment

FIG. 8 is a block diagram showing a configuration of a position measurement apparatus 1A according to the second embodiment of the present invention. By comparison to the position measurement apparatus 1 of the first embodiment, the position measurement apparatus 1A of the present embodiment is characterized by having two polarized wave information reading circuits 110-1 and 110-2, and a position calculator circuit 120A that calculates the relative position of a position detector apparatus 100A fixed to a mobile object among the reflectors 2-1 to 2-12, on the basis of changes in received level difference signals ΔE1 and ΔE2 from the polarized wave information reading circuits 110-1 and 110-2.

Referring to FIG. 8, the position measurement apparatus 1A is configured to include a reflector apparatus 200, and the position detector apparatus 100A. Moreover, the position detector apparatus 100A is configured to include a polarized wave information reading circuit group 601 that includes polarized wave information reading circuits 110-1 and 110-2 provided so as to move on a reflector group 604, and a position calculator circuit 120A. In this case, the polarized wave information reading circuit 110-1 is configured in a manner similar to that of the polarized wave information reading circuit 110 of FIG. 2, and outputs the received level difference signal ΔE1. Moreover, the polarized wave information reading circuit 110-2 is configured in a manner similar to that of the polarized wave information reading circuit 110 of FIG. 2 and outputs the received level difference signal ΔE2. Further, the height of the center C110-1 of the antennas 112 to 114 that configure the polarized wave information reading circuit 110-1 and the height of the center C110-2 of the antennas 112 to 114 that configure the polarized wave information reading circuit 110-2 are each set to the height Zg (See FIG. 1). Moreover, a distance L between the center C110-1 and the center C110-2 is set so that a phase difference between the received level difference signal ΔE1 and the received level difference signal ΔE2 becomes 90 degrees. In concrete, the distance L is expressed by the following equation:

$$L = n \times \Delta xr / 2,$$

where n is a positive odd number.

Referring to FIG. 8, the position calculator circuit 120A is configured to include an arctangent calculator part 401, a counter circuit 402, an angular position converter 403, and an adder 404. The arctangent calculator part 401 performs arctangent calculation by using the following equation using the received level difference signal ΔE1 from the polarized wave information reading circuit 110-1 and the received level difference signal ΔE2 from the polarized wave information reading circuit 110-2, and outputs the angle θ of the calculation result to the counter circuit 402 and the angular position converter 403:

$$\theta = \tan^{-1}(\Delta E2/\Delta E1).$$

Figure 9:
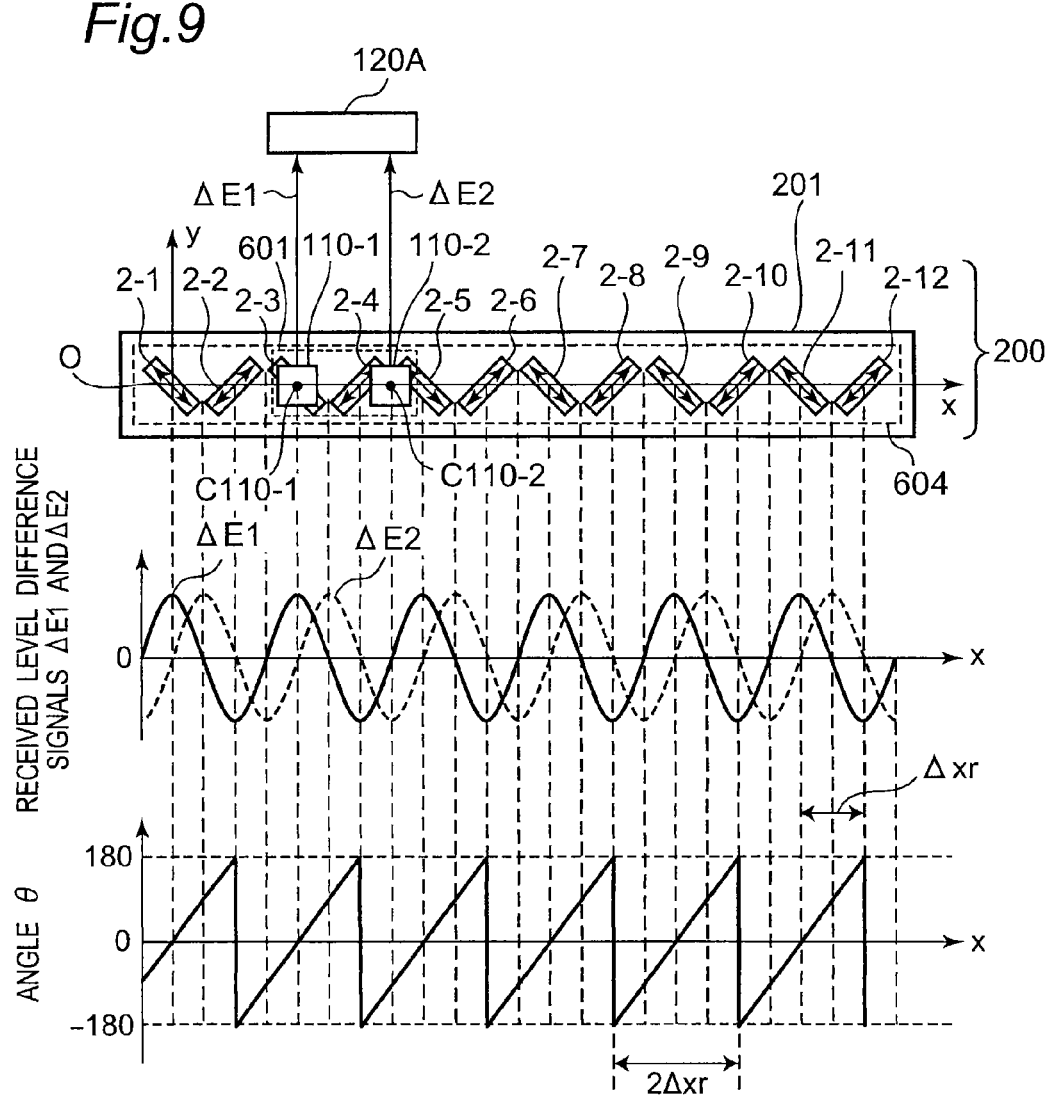
FIG. 9 is a plan view of the reflector apparatus 200 of FIG. 8, a graph of received level difference signals $\Delta E1$ and $\Delta E2$ when the polarized wave information reading circuit group 601 of FIG. 8 moved from the origin O in the positive x-axis direction, and a graph of an angle $\theta$.

FIG. 9 is a plan view of the reflector apparatus 200 of FIG. 8, a graph of the received level difference signals ΔE1 and ΔE2 when the polarized wave information reading circuit group 601 of FIG. 8 moved from the origin O in the positive x-axis direction, and a graph of the angle θ. Referring to FIG. 9, the received level difference signals ΔE1 and ΔE2 are sinusoidal waves, and have a phase difference of 90 degrees between the received level difference signals ΔE1 and ΔE2. Moreover, the angle θ is a periodic function that has a value of −180 degrees to +180 degrees, and has a period 2Δxr that is two times the period of the reflector interval Δxr. Moreover, as shown in FIG. 9, when the polarized wave information reading circuit group 601 moves in the positive x-axis direction, a slope when the angle θ is zero and the slope of the angle θ has a finite value becomes a positive value. When the polarized wave information reading circuit group 601 moves in the negative x-axis direction, the slope when the angle θ is zero and the slope of the angle θ has a finite value becomes a negative value.

Referring to FIG. 8, the counter circuit 402 resets the count value upon receiving a predetermined start signal that instructs the start of the position detection of the position detector apparatus 100A from an external apparatus of the position measurement apparatus 1A, increments the count value when the angle θ is zero and the slope of the angle θ has a positive finite value, and decrements the count value when the angle θ is zero and the slope of the angle θ has a negative finite value. Then, the count value is multiplied by a distance (for example, it is 2Δxr) corresponding to the period of the angle θ, and the multiplication result is outputted as relative position data D402 with the position of the polarized wave information reading circuit group 601 at the time of receiving the start signal served as a reference position to the adder 404.

Moreover, referring to FIG. 8, the angular position converter 403 preparatorily stores a conversion table 403t of relations among the moving direction of the polarized wave information reading circuit group 601, each angle θ discretized by a predetermined resolution, and a relative position (for example, having a value equal to or larger than $-\Delta xr$ and equal to or smaller than $\Delta xr$) corresponding to the position of the polarized wave information reading circuit group 601 when the angle $\theta$ is zero and the slope of the angle $\theta$ has a finite value. The angular position converter 403 detects the moving direction of the polarized wave information reading circuit group 601 on the basis of the slope of the inputted angle $\theta$, converts the inputted angle $\theta$ into the relative position with reference to the conversion table 403*t* on the basis of the detected moving direction and the angle $\theta$, and outputs the converted relative position as relative position data D403 to the adder 404. Further, referring to FIG. 8, the adder 404 adds relative position data D403 to the inputted relative position data D402, and outputs the addition result as position data D404.

For example, when the position measurement apparatus 1A is used for measuring the train position on a railroad, by setting the reflector interval $\Delta xr$ to 30 cm, setting the interval Zg between the position detector apparatus 100A and the reflector apparatus 200 to a value equal to or larger than 10 cm and equal to or smaller than 20 cm, and discretizing the angle $\theta$ into 60 or more angles within a range of $-180$ degrees to $+180$ degrees in the conversion table 403*t*, a positioning accuracy equal to or smaller than 1 cm can be obtained. Moreover, when the position measurement apparatus 1A is used for measuring the cage position of an elevator, by setting the reflector interval $\Delta xr$ to 5 cm, setting the interval Zg between the position detector apparatus 100A and the reflector apparatus 200 to a value equal to or larger than 2 cm and equal to or smaller than 3 cm, and discretizing the angle $\theta$ into 100 or more angles within a range of $-180$ degrees to $+180$ degrees in the conversion table 403*t*, a positioning accuracy equal to or smaller than 1 mm can be obtained.

As described above, according to the present embodiment, since the two polarized wave information reading circuits 110-1 and 110-2 are used, a positioning accuracy smaller than the reflector interval $\Delta xr$ can be obtained, and the relative position of the position detector apparatus 100A can be measured among the reflectors 2-1 to 2-12 with higher accuracy than that of the first embodiment.

It is noted in the present embodiment that the angular position converter 403 converts the inputted angle $\theta$ into the relative position data D403 with reference to the conversion table 403*t* of the relations among the moving direction of the polarized wave information reading circuit group 601, each angle $\theta$ discretized by the predetermined resolution, and the relative position with respect to the position of the polarized wave information reading circuit group 601 when the angle $\theta$ is zero and the slope of the angle $\theta$ has a finite value. However, the present invention is not limited to this. The angular position converter 403 may convert the inputted angle $\theta$ into the relative position data D403 with reference to the predetermined conversion equations of relations among the moving direction of the polarized wave information reading circuit group 601, each angle $\theta$ discretized by a predetermined resolution, and the relative position with respect to the position of the polarized wave information reading circuit group 601 when the angle $\theta$ is zero and the slope of the angle $\theta$ has a finite value.

Third Embodiment

Figure 10:
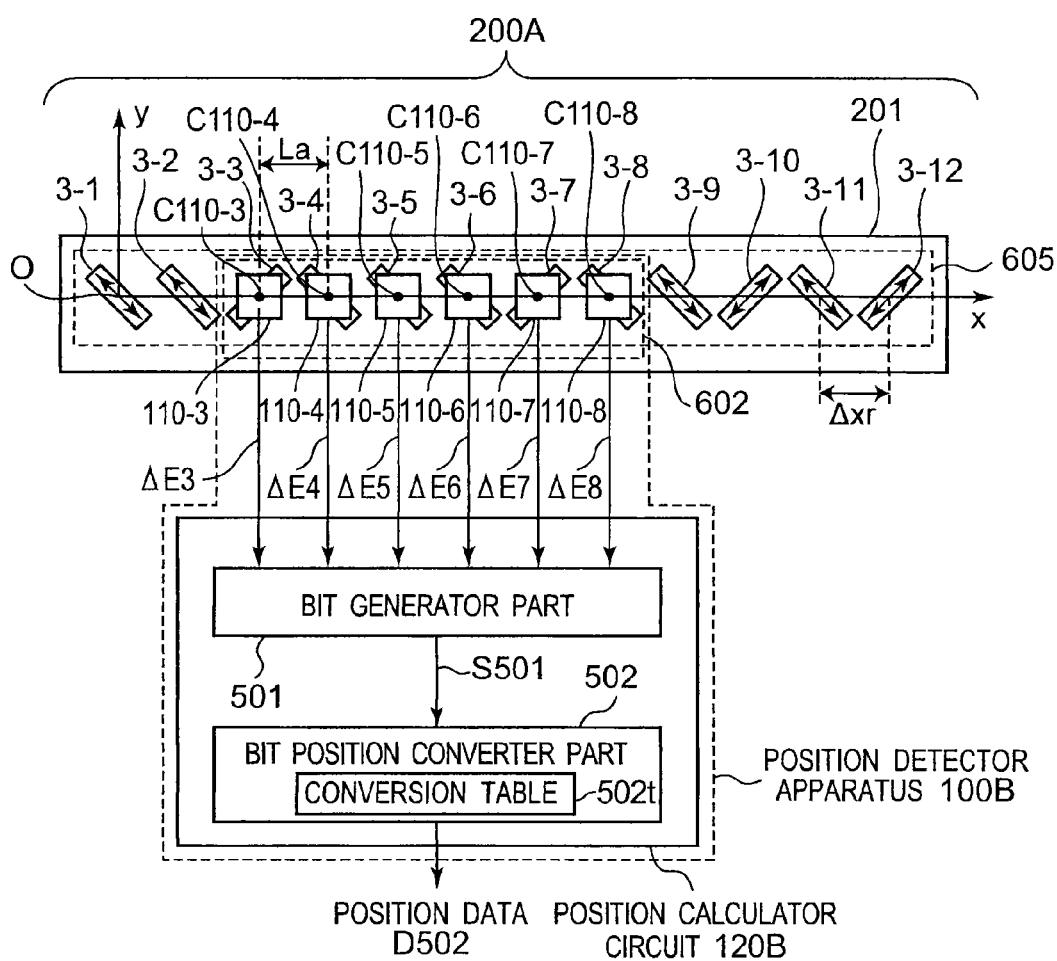
FIG. 10 is a block diagram showing a configuration of a position measurement apparatus 1B according to a third embodiment of the present invention.

FIG. 10 is a block diagram showing a configuration of a position measurement apparatus 1B according to the third embodiment of the present invention. Referring to FIG. 10, the position measurement apparatus 1B is configured to include a position detector apparatus 100B, and a reflector apparatus 200A. Moreover, the reflector apparatus 200A is configured to include a rectangular resin plate 201 and a reflector group 605, and the reflector group 605 is configured to include 12 reflectors 3-1 to 3-12. The reflectors 3-1 to 3-12 are metal bars having the same length. In this case, as shown in FIG. 10, the center of the reflector 3-1 is defined as the origin O of the right-handed xyz coordinate system, the upward direction with respect to the origin O is defined as the positive direction of the z axis, and the lengthwise direction of the resin plate 201 is defined as the x-axis direction. Referring to FIG. 10, the reflectors 3-1 to 3-12 are embedded in the surface of the resin plate 201 so that the centers of the reflectors 3-1 to 3-12 are arranged at a reflector interval $\Delta xr$ in the positive part of the x axis.

As described in detail later, the position measurement apparatus 1B of the present embodiment has the following features.

(a) The reflector apparatus 200A is configured to include a reflector group 605 including the reflectors 3-1 to 3-12 arranged at a reflector interval $\Delta xr$. In this case, the reflectors 3-1 to 3-12 are provided so that, when six reflectors adjacent to each other are selected from the reflectors 3-1 to 3-12 by sequentially shifting the six reflectors adjacent to each other by one reflector, polarization direction patterns of reflected waves from the six reflectors selected as described above become different from each other.

(b) The position detector apparatus 100B is configured to include six polarized wave information reading circuits 110-3 to 110-8 provided at an interval La identical to the reflector interval $\Delta xr$. In this case, the polarized wave information reading circuits 110-3 to 110-8 are each configured in a manner similar to that of the polarized wave information reading circuit 110, and generate received level difference signals $\Delta E3$ to $\Delta E8$.

(c) The position calculator circuit 120B calculates the absolute position of the mobile object to which the position detector apparatus 100B is fixed on the transfer pathway (that is a pathway along the x axis of FIG. 10), on the basis of the patterns of the received level difference signals $\Delta E3$ to $\Delta E8$.

Referring to FIG. 10, each angle between each of the reflectors 3-1 to 3-12 and the y axis is set so as to correspond to the bit data "0" or the bit data "1". In concrete, the angle between the lengthwise direction of each of the reflectors 3-1, 3-2, 3-4 to 3-6, 3-8, 3-9 and 3-11 and the y axis is set to an angle of +45 degrees corresponding to the bit data "1", and the angle between the lengthwise direction of each of the reflectors 3-3, 3-7, 3-10 and 3-12 and the y axis is set to an angle of $-45$ degrees corresponding to the bit data "0". In this case, for example, a code having, for example, characterized in that an identical pattern does not exist in an arbitrary consecutive bit interval in a bit pattern of 12 bits expressed by each angle between each of the reflectors 3-1 to 3-12 and the y axis is used. For example, in the case of a code having a code length of 63 bits, a code characterized in that an identical pattern does not exist in an arbitrary consecutive six-bit interval is used. The bit pattern of 12 bits (that is a bit pattern of "110111011010" in the case of FIG. 10) corresponding to each angle between each of the reflectors 3-1 to 3-12 of the present embodiment and the y axis corresponds to part of the aforementioned code length of 63 bits.

Moreover, referring to FIG. 10, the position detector apparatus 100B is configured to include a polarized wave information reading circuit group 602 provided so as to move on the reflector group 605, and a position calculator circuit 120B. The polarized wave information reading circuit group 602 is configured to include polarized wave information reading circuits 110-3 to 110-8 each of which is configured in a manner similar to that of the polarized wave information reading circuit 110 (See FIG. 2), generates received level difference signals ΔE3 to ΔE8, and outputs the received level difference signals ΔE3 to ΔE8 to the position calculator circuit 120B. In this case, the height of each of the centers C110-3 to C110-8 of the antennas 112 to 114 that configure respective polarized wave information reading circuits 110-3 to 110-8 is set to the height Zg (See FIG. 1). Moreover, the polarized wave information reading circuits 110-3 to 110-8 are provided so that the centers C110-3 to C110-8 are arranged on the x axis at an interval La equal to the reflector interval Δxr.

Further, referring to FIG. 10, the position calculator circuit 120B is configured to include a bit generator part 501, and a bit position converter part 502. The bit generator part 501 converts the inputted received level difference signals ΔE3 to ΔE8 into a six-bit code signal S501 on the basis of the sign of each of the reference received level difference signals ΔE3 to ΔE8, and outputs the six-bit code signal S501 to the bit position converter part 502. In concrete, each of the inputted received level difference signals ΔE3 to ΔE8 is converted into bit data "1" when the sign is positive or converted into bit data "0" when the sign is negative, generating a code signal S501 including converted six bit data. The bit position converter part 502 preparatorily stores a conversion table 502t of relations between the code signal S501 and the absolute position of the polarized wave information reading circuit group 602, converts the code signal S501 into the absolute position of the polarized wave information reading circuit group 602 with reference to the conversion table 502t on the basis of the inputted code signal S501, and outputs the resultant as position data D502.

As described above, according to the present embodiment, the polarization directions of the reflected waves reflected by the reflectors 3-1 to 3-12 are set so that the polarization direction patterns of the reflected waves by the consecutive six reflectors become different from each other. Therefore, the absolute position of the polarized wave information reading circuit group 602 can be more accurately measured on the basis of the received level difference signals ΔE3 to E8 from the six polarized wave information reading circuits 110-3 to 110-8 than that of the prior art.

Although the bit data "0" or "1" is allocated to the received level difference signals ΔE3 to ΔE8 in the present embodiment, the present invention is not limited to this, and the pattern of each of the received level difference signals ΔE3 to ΔE8 may be used.

Moreover, although the six polarized wave information reading circuits 110-3 to 110-8 and the 12 reflectors 3-1 to 3-12 are used in the present embodiment, the present invention is not limited to this. It is preferable to use a plurality of P reflectors (where P is an integer equal to or larger than three) and a plurality of M polarized wave information reading circuits 110 (where M is an integer equal to or larger than two smaller than P). In this case, the bit pattern of P bits corresponding to each angle between each reflector and the y axis is set so that an identical bit pattern does not exist in each interval of consecutive M bits.

Further, although the bit pattern of 12 bits (that is a bit pattern "110111011010" in the case of FIG. 10) expressed by the polarization direction of reflected waves from each of the reflectors 3-1 to 3-12 corresponds to the code of the code length of sixty three bits in the present embodiment, the present invention is not limited to this. The polarization direction patterns of the reflected waves from the reflectors 3-1 to 3-12 may be set so as to correspond to a consecutive partial code selected from a pseudo-random code.

Fourth Embodiment

Figure 11:
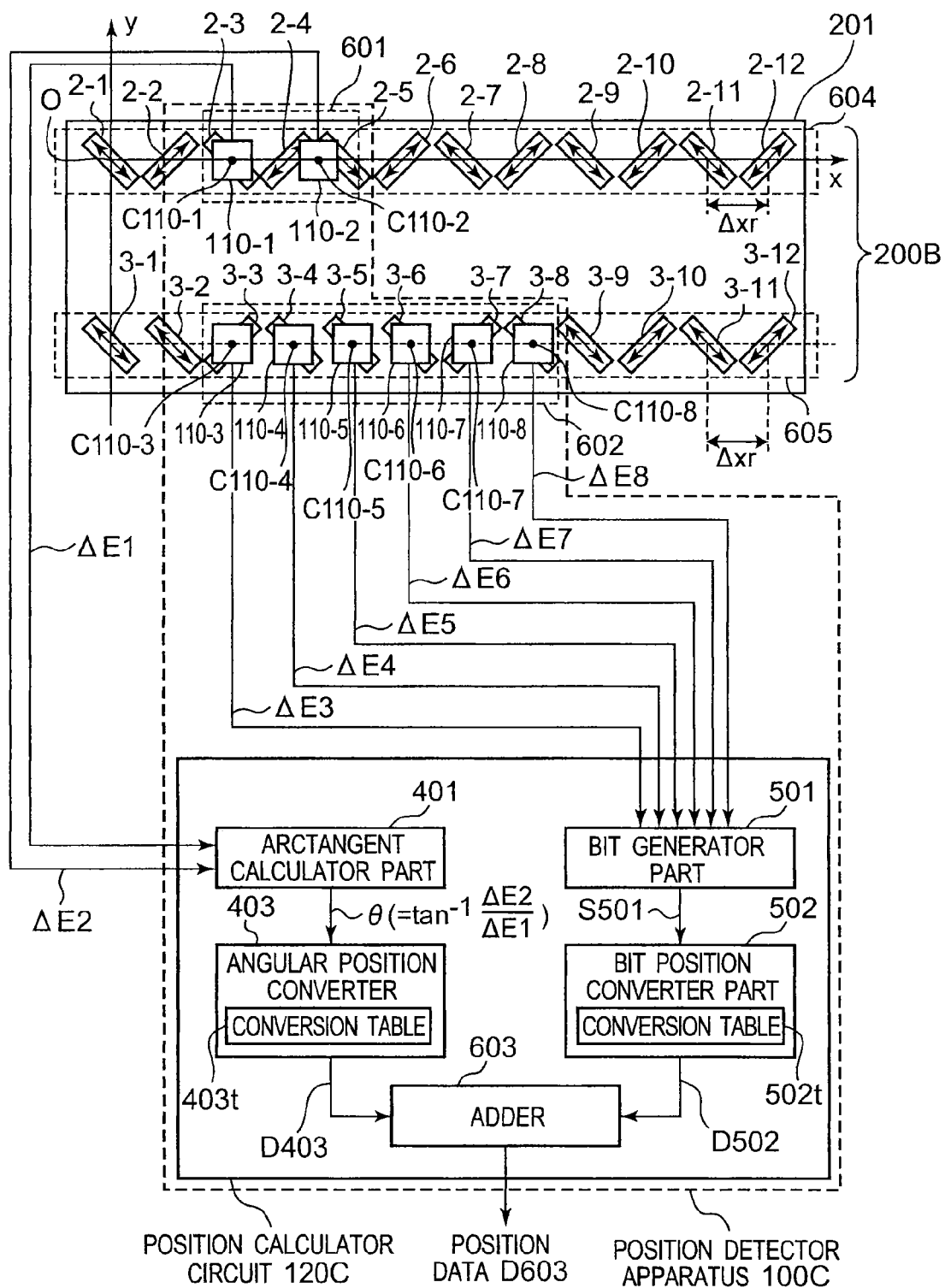
FIG. 11 is a block diagram showing a configuration of a position measurement apparatus 1C according to a fourth embodiment of the present invention.

FIG. 11 is a block diagram showing a configuration of a position measurement apparatus 1C according to the fourth embodiment of the present invention. Referring to FIG. 11, the position measurement apparatus 1C is configured to include a position detector apparatus 100C, and a reflector apparatus 200B. In this case, the reflector apparatus 200B is configured to include a resin plate 201, a reflector group 604 configured in a manner similar to that of the first embodiment, and a reflector group 605 configured in a manner similar to that of the third embodiment. Moreover, the reflector group 605 is provided to be parallel to the reflector group 604, and the x-coordinate of the reflector 2-1 is equal to the x-coordinate of the reflector 3-1.

As described in detail later, the position measurement apparatus 1C of the present embodiment has the following features.

(a) The reflector apparatus 200B is configured to include the reflector group 605 of the third embodiment, and the reflector group 604 that includes the reflectors 2-1 to 2-12 arranged at the reflector interval Δxr and is provided to be parallel to the reflector group 605. In this case, the reflectors 2-1 to 2-12 of the reflector group 604 are provided so that the polarization directions of reflected waves from a pair of reflectors adjacent to each other are different from each other.

(b) By comparison to the position detector apparatus 100B, the position detector apparatus 100C further includes two polarized wave information reading circuits 110-1 and 110-2 provided mutually at a predetermined interval. In this case, the polarized wave information reading circuits 110-1 and 110-2 are each configured in a manner similar to that of the polarized wave information reading circuit 110, and generate received level difference signals ΔE1 and ΔE2, respectively. Moreover, an interval between the polarized wave information reading circuits 110-1 and 110-2 is set to an interval obtained by multiplying the reflector interval Δxr by a value which is obtained by dividing a predetermined positive odd number by two.

(c) The position calculator 120C calculates the absolute position of the mobile object to which the position detector apparatus 100C is fixed on the transfer pathway between the reflectors 3-1 to 3-12, on the basis of the patterns of six received level difference signals ΔE3 to ΔE8 from six polarized wave information reading circuits 110-3 to 110-8, and changes in two received level difference signals ΔE1 and ΔE2 from the polarized wave information reading circuits 110-1 and 110-2.

Referring to FIG. 11, the position detector apparatus 100C is configured to include a polarized wave information reading circuit group 601 that is configured in a manner similar to that of the second embodiment and provided so as to move on the reflector group 604, a polarized wave information reading circuit group 602 that is configured in a manner similar to that of the third embodiment and provided so as to move on the reflector group 605, and a position calculator circuit 120C. Further, the position calculator circuit 120C is configured to include an arctangent calculator part 401, an angular position converter 403 that preparatorily stores a conversion table 403t, a bit generator part 501, a bit position converter part 502 that preparatorily stores a conversion table 502t, and an adder 603. The arctangent calculator part 401 calculates the angle θ on the basis of the received level difference signals ΔE1 and ΔE2 in a manner similar to that of the second embodiment, and outputs the angle to the angular position converter 403. Moreover, the angular position converter 403 detects the moving direction of the polarized wave information reading circuit group 601 on the basis of the slope of the inputted angle θ in a manner similar to that of the second embodiment, converts the inputted angle θ into relative position data D403 with reference to the conversion table 403t on the basis of the detected moving direction and the angle θ, and outputs the resulting data to the adder 603.

On the other hand, referring to FIG. 11, the bit generator part 501 converts the received level difference signals ΔE3 to ΔE8 into a six-bit code signal S501 in a manner similar to that of the third embodiment, and outputs the resulting signal to the bit position converter part 502. Further, the bit position converter part 502 converts the code signal S501 into the absolute position of the polarized wave information reading circuit group 602 with reference to the conversion table 502t on the basis of the inputted code signal S501, and outputs the resultant as position data D502 to the adder 603. Then, the adder 603 adds the relative position data D403 to the position data D502, and outputs the resulting data as position data D603.

As described above, according to the present embodiment, the reflector group 604 and the polarized wave information reading circuit group 601 are further provided by comparison to the third embodiment. Therefore, the absolute position of the mobile object can be measured with accuracy finer than the reflector interval Δxr by comparison to the third embodiment.

Fifth Embodiment

Figure 12:
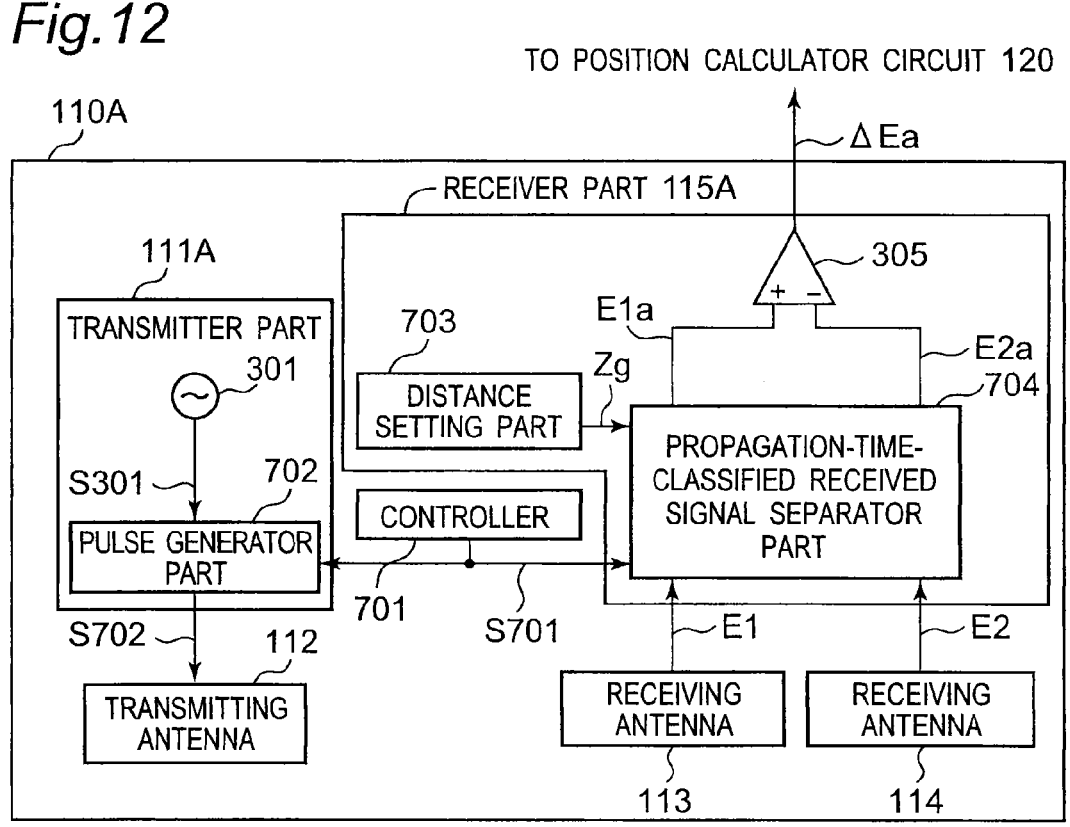
FIG. 12 is a block diagram showing a configuration of a polarized wave information reading circuit 110A according to a fifth embodiment of the present invention.

FIG. 12 is a block diagram showing a configuration of a polarized wave information reading circuit 110A according to the fifth embodiment of the present invention. Referring to FIG. 12, the polarized wave information reading circuit 110A is configured to include a controller 701, a transmitter part 111A including an oscillator 301 and a pulse generator part 702, a transmitting antenna 112, a receiving antenna 113, a receiving antenna 114, and a receiver part 115A. Moreover, the receiver part 115A is configured to include a distance setting part 703, a propagation-time-classified received signal separator part 704, and a received level difference calculator 305. In this case, the controller 701 outputs a predetermined control signal to the pulse generator part 702 and the propagation-time-classified received signal separator part 704.

The polarized wave information reading circuit 110A of the present embodiment is characterized in that the polarized wave information reading circuit 110A separates a once-reflected wave that has been reflected once by the reflector apparatus 200 from the received reflected waves, and generates a received level difference signal ΔEa on the basis of the separated once-reflected wave.

Referring to FIG. 12, the oscillator 301 generates an oscillation signal S301 having a predetermined frequency, and outputs the oscillation signal S301 to the pulse generator part 702. Moreover, the pulse generator part 702 generates a pulse signal having a predetermined frequency in response to a control signal S701, multiplies the oscillation signal S301 by the pulse signal, and outputs a transmission signal S702 of the multiplication result to the transmitting antenna 112. The transmitting antenna 112 radiates the transmission signal S702 as radio waves in a manner similar to that of the first embodiment. The radiated radio waves are reflected by the reflector apparatus 200 in a manner similar to that of the first embodiment, and thereafter received by the receiving antennas 113 and 114. Further, the receiving antennas 113 and 114 output received signals E1 and E2, respectively, to the propagation-time-classified received signal separator part 704. Then, the propagation-time-classified received signal separator part 704 discretizes the inputted received signals E1 and E2 by respective predetermined time resolutions.

Figure 13:
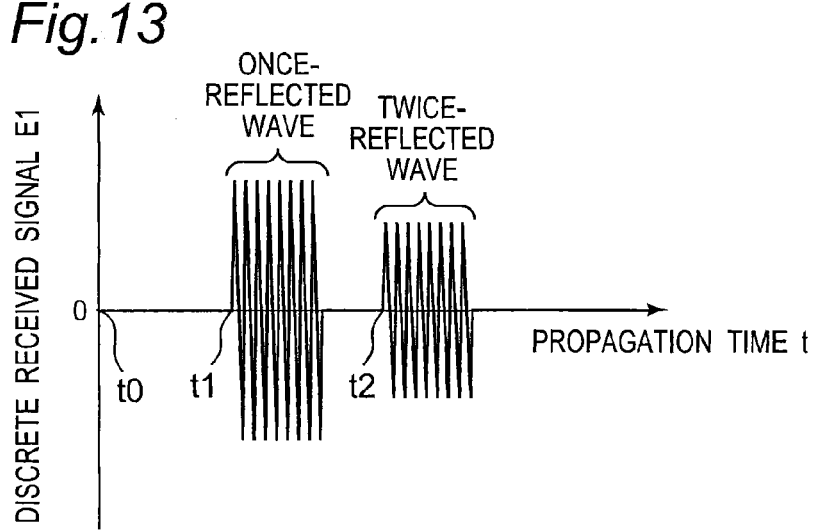
FIG. 13 is a graph of a received signal E1 discretized by a propagation-time-classified received signal separator part 704 of FIG. 12.

FIG. 13 is a graph of the received signal E1 discretized by the propagation-time-classified received signal separator part 704 of FIG. 12. Referring to FIG. 13, the radio waves radiated from the transmitting antenna 113 at an output timing t0 of the control signal S701 are reflected on the reflector apparatus 200 and thereafter received by the receiving antenna 113. At this time, the once-reflected wave is received after a lapse of a propagation time t1, and twice-reflected wave is received after a lapse of a propagation time t2.

Referring to FIG. 12, the propagation-time-classified received signal separator part 704 detects the propagation time t1 of the once-reflected wave included in the discretized received signal E1, and calculates a distance Zc of the antennas 112 to 114 from the reflector apparatus 200 on the basis of the detected propagation time t1 by using the following equation:

$$Zc = c \times t1/2,$$

where c is a velocity of light.

On the other hand, the distance setting part 703 preparatorily stores data of the actual interval Zg (See FIG. 1) from the reflector apparatus 200 of the antennas 112 to 114, and outputs the same data of the interval Zg to the propagation-time-classified received signal separator part 704. The propagation-time-classified received signal separator part 704 removes multipath reflected waves such as the twice-reflected wave received after a lapse of the propagation time t2 from the discretized received signal E1 to separate only the once-reflected wave. Further, on the assumption that the level of the received signal E1 is inversely proportional to the propagation distance of radio waves, the propagation-time-classified received signal separator part 704 corrects the level of the once-reflected wave included in the discretized received signal E1 on the basis of the inputted interval Zg and the calculated distance Zc, and outputs the corrected discretized received signal E1a to the non-inverted input terminal of the received level difference calculator 305. The propagation-time-classified received signal separator part 704 separates only the once-reflected wave by removing the multipath reflected waves from the discretized received signal E2 in a manner similar to that of the discretized received signal E1, and corrects the level of the separated once-reflected wave. Then, the propagation-time-classified received signal separator part 704 outputs the corrected discretized received signal E2a to the non-inverted input terminal of the received level difference calculator 305. An output signal from the received level difference calculator 305 is outputted as a received level difference signal ΔEa to the position calculator circuit 120.

It is noted that the frequency of the pulse signal generated by the pulse generator part 702 is set to be lower than the frequency of the oscillation signal S301 so that the twice-reflected wave is not superimposed on the once-reflected wave in the received signals E1 and E2. For example, in the example of FIG. 13, the frequency of the pulse signal generated by the pulse generator part 702 is set to one-eighth of the frequency of the oscillation signal S301. Although the example in which the twice-reflected wave and the once-reflected wave are completely separated is shown in FIG. 13, it is only required that part of the once-reflected wave is not superimposed on the twice-reflected wave, and it is acceptable to use a signal of once-reflected wave that is partially superimposed on the twice-reflected wave.

As described above, the multipath reflected waves are removed from the received signals E1 and E2, and the level of the once-reflected wave is corrected. Therefore, influences of the vibrations of the mobile object, multipath reflection, and reflected waves from peripheral metals can be corrected, and the position of the mobile object can be measured with higher accuracy by comparison to each of the aforementioned embodiments.

Although the received level of the once-reflected wave included in the received signals E1 and E2 is extracted by using the pulse signal in the present embodiment, the present invention is not limited to this. For example, it is acceptable to modulate the oscillation signal S301 according to a predetermined code sequence and radiate the resulting signal from the transmitting antenna 112. Moreover, it is acceptable to generate a frequency modulated-continuous wave signal (FM-CW (Frequency Modulated-Continuous Wave) signal), an FM (Frequency Modulated) pulse signal or an orthogonal frequency division multiplexing (OFDM (Orthogonal Frequency Division Multiplexing)) signal on the basis of the oscillation signal S301 and radiate the resulting signal from the transmitting antenna 112.

Sixth Embodiment

Figure 14:
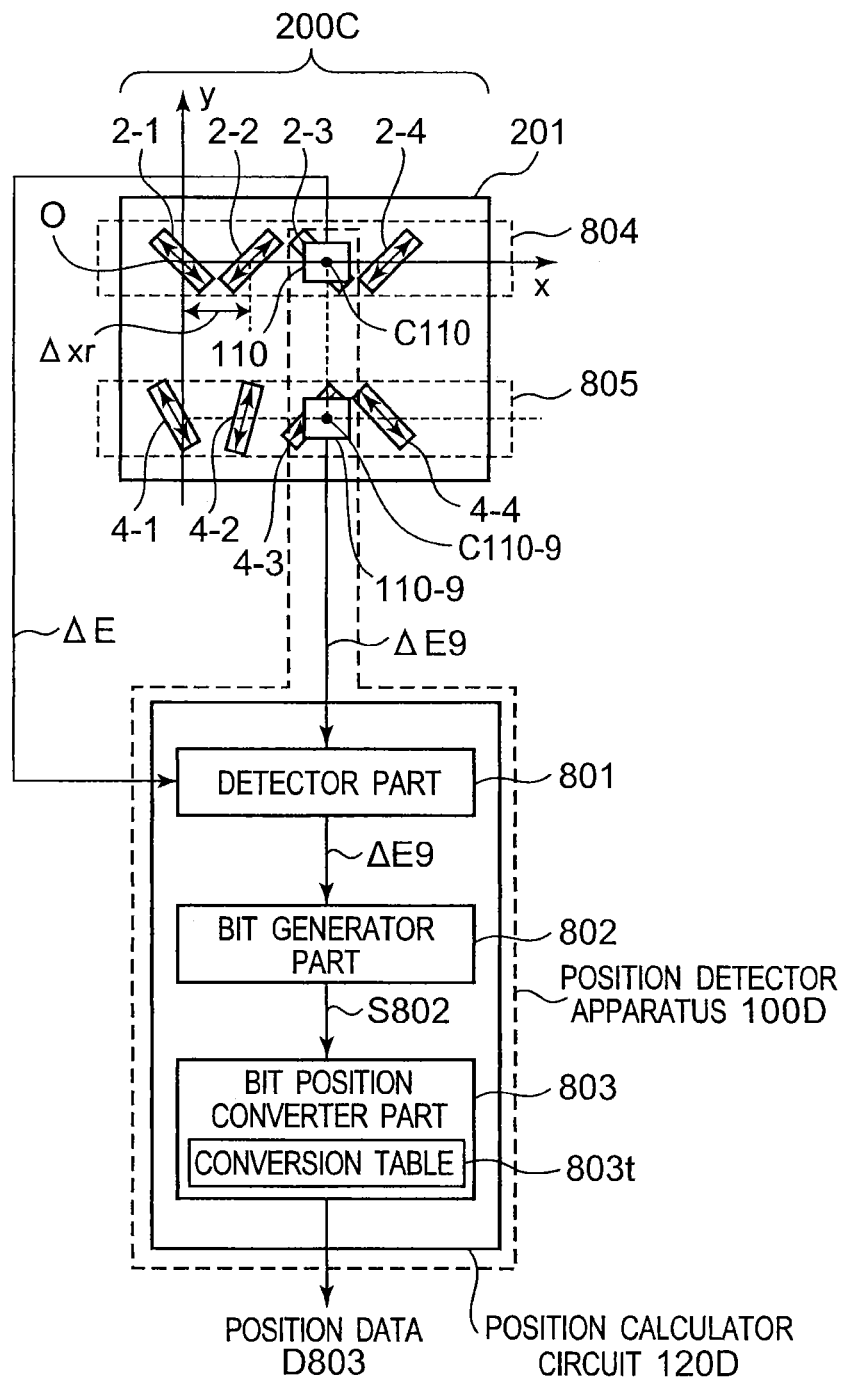
FIG. 14 is a block diagram showing a configuration of a position measurement apparatus 1D according to a sixth embodiment of the present invention.

FIG. 14 is a block diagram showing a configuration of a position measurement apparatus 1D according to the sixth embodiment of the present invention. Referring to FIG. 14, a position measurement apparatus 1D is configured to include a position detector apparatus 100D, and a reflector apparatus 200C. Moreover, the reflector apparatus 200C is configured to include a rectangular resin plate 201, a reflector group 804, and a reflector group 805. In this case, the reflector group 804 is configured to include four reflectors 2-1 to 2-4 that are arranged at a reflector interval $\Delta xr$ in a manner similar to that of the reflectors 2-1 to 2-4 of the reflector apparatus 200 of the first embodiment. Moreover, the reflector group 805 is provided to be parallel to the reflector group 804 and configured to include reflectors 4-1 to 4-4 of four metal bars that are arranged at the reflector interval $\Delta xr$ and have an identical length. Further, the x-coordinate of the reflector 2-1 is equal to the x-coordinate of the reflector 4-1. Further, referring to FIG. 14, an angle between the reflector 4-1 and the y axis is set to +15 degrees, and an angle between the reflector 4-2 and the y axis is set to −15 degrees. An angle between the reflector 4-3 and the y axis is set to −45 degrees, and an angle between the reflector 4-4 and the y axis is set to +45 degrees.

Moreover, referring to FIG. 14, a position detector apparatus 100D is configured to include a polarized wave information reading circuit 110 that is provided so as to move on the reflector group 804, a polarized wave information reading circuit 110-9 that is provided so as to move on the reflector group 805 and be configured in a manner similar to that of the polarized wave information reading circuit 110, and a position calculator circuit 120D. In this case, the position calculator circuit 120D is configured to include a detector part 801, a bit generator part 802, and a bit position converter part 803. Referring to FIG. 14, the polarized wave information reading circuit 110 generates a received level difference signal $\Delta E$ in a manner similar to that of the first embodiment, and outputs the received level difference signal $\Delta E$ to the detector part 801. Moreover, the polarized wave information reading circuit 110-9 generates a received level difference signal $\Delta E9$ in a manner similar to that of the polarized wave information reading circuit 110, and outputs the received level difference signal $\Delta E9$ to the detector part 801.

As described in detail later, the position measurement apparatus 1D of the present embodiment has the following features.

(a) The reflector apparatus 200C is configured to include a reflector group 805 that includes reflectors 4-1 to 4-4 arranged at the reflector interval $\Delta xr$, and a reflector group 804 that includes reflectors 2-1 to 2-4 arranged at the reflector interval $\Delta xr$, and is provided to be parallel to the reflector group 805. In this case, the reflectors 4-1 to 4-4 are provided so that the polarization directions of reflected waves from the reflectors 4-1 to 4-4 are different from each other, and the reflectors 2-1 to 2-4 are provided so that the polarization directions of reflected waves from a pair of reflectors adjacent to each other are different from each other.

(b) The position detector apparatus 100D is configured to include two polarized wave information reading circuits 110-9 and 110 provided in correspondence with the reflector group 805 and the reflector group 804, respectively. In this case, the polarized wave information reading circuit 110-9 radiates radio waves toward the reflector group 805 to generate a received level difference signal $\Delta E9$, and the polarized wave information reading circuit 110 radiates radio waves toward the reflector group 804 to generate a received level difference signal $\Delta E$.

(c) The position calculator circuit 120D calculates the absolute position of the mobile object to which the position detector apparatus 100D is fixed on the transfer pathway (pathway along the x axis of FIG. 14) on the basis of changes in the received level difference signals $\Delta E9$ and $\Delta E$.

Figure 15:
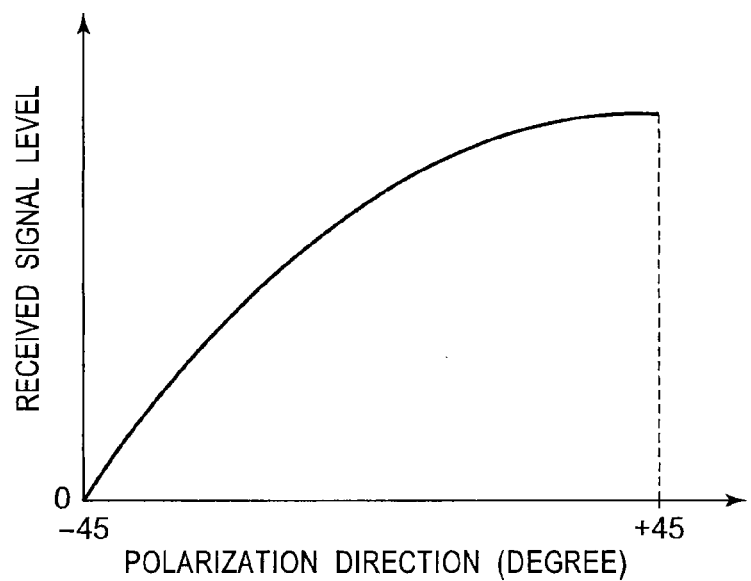
FIG. 15 is a graph showing a received signal level when a receiving antenna 113 that receives linearly polarized radio waves having polarization directions of +45 degrees configuring a polarized wave information reading circuit 110-9 of FIG. 14 received linearly polarized radio waves having polarization directions of −45 degrees to +45 degrees.

FIG. 15 is a graph showing a received signal level when a receiving antenna 113 that receives linearly polarized radio waves having a polarization direction of +45 degrees configuring the polarized wave information reading circuit 110-9 of FIG. 14 received linearly polarized radio waves having a polarization direction of −45 degrees to +45 degrees. Referring to FIG. 15, when the polarization direction of the received radio waves increases from −45 degrees to +45 degrees, the received signal level increases. Then, the received signal level is maximized when the polarization direction of the received radio waves is +45 degrees, and the received signal level is minimized when the polarization direction of the received radio waves is −45 degrees. Likewise, when the receiving antenna that receives the linearly polarized radio waves having a polarization direction of −45 degree receives the linearly polarized radio waves having a polarization direction of −45 degrees to +45 degrees, the received signal level is maximized when the polarization direction of the received radio waves is −45 degrees, and the received signal level is minimized when the polarization direction of the received radio waves is +45 degrees.

Figure 16:
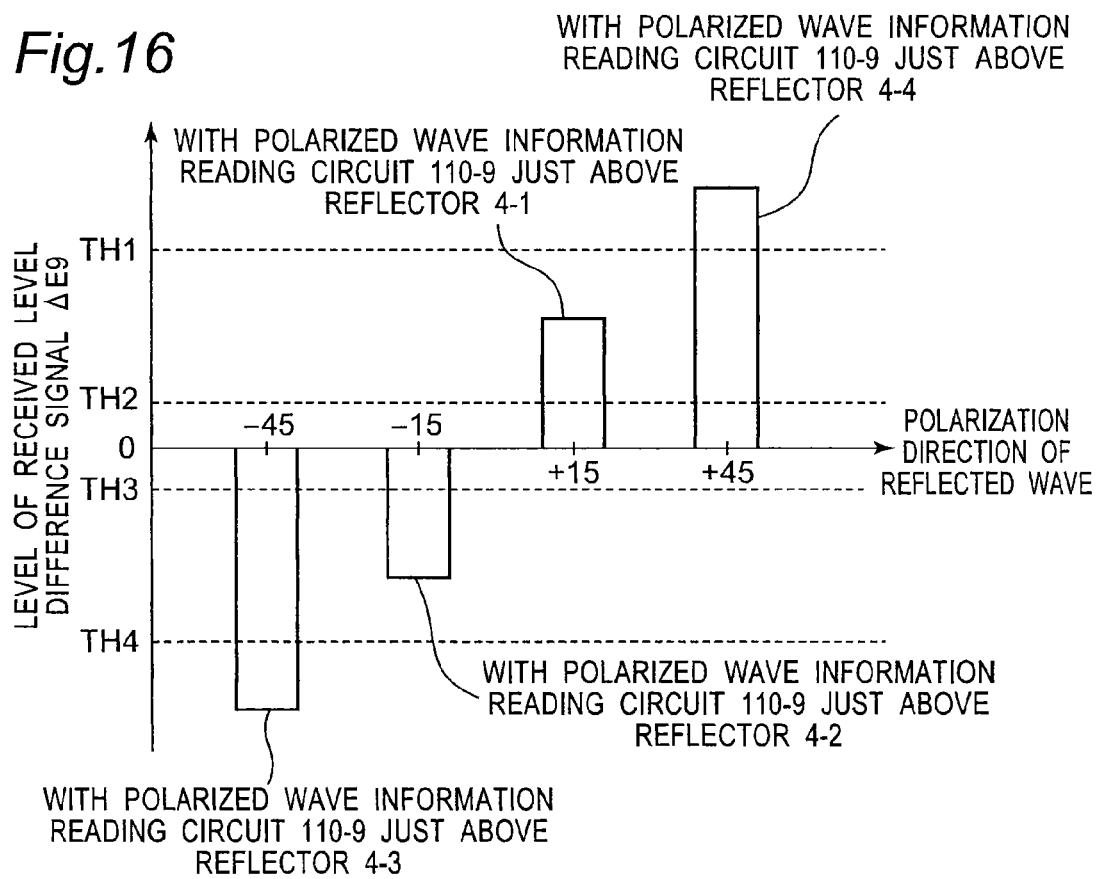
FIG. 16 is a bar graph showing a received level difference signal $\Delta E9$ when the polarized wave information reading circuit 110-9 of FIG. 14 is located just above a reflector 4-1, 4-2, 4-3 or 4-4.

FIG. 16 is a bar graph showing a received level difference signal $\Delta E9$ when the polarized wave information reading circuit 110-9 of FIG. 14 is located just above the reflector 4-1, 4-2, 4-3 or 4-4. Referring to FIG. 16, the level of the received level difference signal $\Delta E9$ changes in accordance with the polarization direction of the reflected wave radiated from the reflector 4-1, 4-2, 4-3 or 4-4. Therefore, four threshold values TH1, TH2, TH3 and TH4 can be set so as to discriminate the reflectors 4-1, 4-2, 4-3 and 4-4 on the basis of the received level difference signal $\Delta E9$.

Referring to FIG. 14, the detector part 801 detects that the center C110 of the antennas 112 to 114 that configure the polarized wave information reading circuit 110 is located just above any one of the reflectors 2-1 to 2-4 by detecting the maximum value or the minimum value of the inputted received level difference signal ΔE, and outputs the received level difference signal ΔE9 at the detection timing to the bit generator part 802.

Moreover, referring to FIG. 14, the bit generator part 802 discriminates which reflector of the reflectors 4-1 to 4-4 the center C110-9 of the antennas 112 to 114 that configure the polarized wave information reading circuit 110-9 is located just above on the basis of the level of the inputted received level difference signal ΔE9 and the threshold values TH1, TH2, TH3 and TH4 of FIG. 16. Then, a predetermined bit signal S802 is generated in accordance with the discriminated reflector, and outputted to the bit position converter part 803. In concrete, when the center C110-9 is located just above the reflectors 4-1, 4-2, 4-3 and 4-4, the bit generator part 802 generates a bit signal S802 that includes bit data "01", "10", "00" and "11", respectively.

Further, referring to FIG. 14, the bit position converter part 803 preparatorily stores a conversion table 803t of relations between the bit data included in the bit signal S802 and the position of the polarized wave information reading circuit 110-9. The bit position converter part 803 converts the bit data included in the inputted bit signal S802 into the position of the polarized wave information reading circuit 110-9 with reference to the conversion table 803t, and outputs the resulting position as position data D803.

As described above, according to the present embodiment, the reflectors 4-1 to 4-4 that radiate the reflected waves in polarization directions different from each other are provided, and therefore, the position of the polarized wave information reading circuit 110-9 can be expressed by bit data of two bits. Therefore, the total length of the reflector apparatus 200C can be shortened by comparison to each of the aforementioned embodiments, and a small-size low-cost position measurement apparatus 1D can be actualized.

Seventh Embodiment

FIG. 17 is a block diagram showing a configuration of a position measurement apparatus 1E according to the seventh embodiment of the present invention. Referring to FIG. 17, the position measurement apparatus 1E is configured to include a position detector apparatus 100E and a reflector apparatus 200D. Moreover, the reflector apparatus 200D is characterized by having a reflector group 905 in place of the reflector group 805 by comparison to the reflector apparatus 200C of FIG. 14. Further, the reflector group 905 is configured to include reflectors 5-1 and 5-2 of metal bars in place of the reflectors 4-1 and 4-2 by comparison to the reflector group 805. An angle between the reflector 5-1 and the y axis is set to +45 degrees in a manner similar to that of an angle between the reflector 4-4 and the y axis, and the length of the reflector 5-1 is shorter than the length of the reflector 4-4. Therefore, the reflection area of the reflector 5-1 becomes smaller than that of the reflector 4-4, and the reflectance of the reflector 5-1 is smaller than the reflectance of the reflector 4-4. Moreover, an angle between the reflector 5-2 and the y axis is set to −45 degrees in a manner similar to that of an angle between the reflector 4-3 and the y axis, and the length of the reflector 5-2 is shorter than the length of the reflector 4-3. Therefore, the reflection area of the reflector 5-2 becomes smaller than that of the reflector 4-3, and the reflectance of the reflector 5-2 is smaller than the reflectance of the reflector 4-3.

Moreover, referring to FIG. 17, the position detector apparatus 100E is configured to include a polarized wave information reading circuit 110 that is provided so as to move on the reflector group 804, a polarized wave information reading circuit 110-9 that is provided so as to move on the reflector group 905 and be configured in a manner similar to that of the polarized wave information reading circuit 110, and a position calculator circuit 120E. In this case, the position calculator circuit 120E is configured to include a detector part 901, a bit generator part 902, and a bit position converter part 903. Referring to FIG. 17, the polarized wave information reading circuit 110 generates a received level difference signal ΔE in a manner similar to that of the first embodiment, and outputs the received level difference signal ΔE to the detector part 901. Moreover, the polarized wave information reading circuit 110-9 generates a received level difference signal ΔE9 in a manner similar to that of the polarized wave information reading circuit 110, and outputs the received level difference signal ΔE9 to the detector part 901.

As described in detail later, the position measurement apparatus 1E of the present embodiment has the following features.

(a) The reflector apparatus 200D is configured to include a reflector group 905 that includes reflectors 5-1 to 5-4 arranged at the reflector interval Δxr, and a reflector group 804 that includes reflectors 2-1 to 2-4 arranged at the reflector interval Δxr and are provided to be parallel to the reflector group 905. In this case, the reflectors 5-1 to 5-4 are provided so that combinations of the polarization directions of reflected waves from the reflectors 5-1 to 5-4 and the reflectances of the reflectors 5-1 to 5-4 are different from each other, and the reflectors 2-1 to 2-4 are provided so that the polarization directions of reflected waves from each pair of second reflectors adjacent to each other are different from each other.

(b) The position detector apparatus 100E is configured to include two polarized wave information reading circuits 110-9 and 110 provided in correspondence with the reflector group 905 and the reflector group 804, respectively. In this case, the polarized wave information reading circuit 110-9 radiates radio waves toward the reflector group 805 to generate a received level difference signal ΔE9, and the polarized wave information reading circuit 110 radiates radio waves toward the reflector group 804 to generate a received level difference signal ΔE. It is noted that the received level difference signal ΔE9 corresponds to the polarization direction of reflected waves from the reflector group 905 and reflectance on the reflector group 905.

(c) The position calculator circuit 120D calculate the absolute position of the mobile object to which the position detector apparatus 100D is fixed on the transfer pathway (pathway along the x axis of FIG. 17) on the basis of changes in the received level difference signals ΔE9 and ΔE.

FIG. 18 is a bar graph showing each received level difference signal ΔE9 when the polarized wave information reading circuit 110-9 of FIG. 17 is located just above a reflector 5-1, 5-2, 4-3 or 4-4. Referring to FIG. 18, the level of the received level difference signal ΔE9 changes in accordance with the polarization direction of reflected waves radiated from the reflectors 5-1, 5-2, 4-3, and 4-4. Therefore, four threshold values TH1a, TH2a, TH3a and TH4a can be set so as to discriminate the reflectors 5-1, 5-2, 4-3 and 4-4 on the basis of the received level difference signal ΔE9.

Referring to FIG. 17, the detector part 901 detects that the center C110 of the antennas 112 to 114 that configure the polarized wave information reading circuit 110 is located just above any one of the reflectors 2-1 to 2-4 by detecting the maximum value and the minimum value of the inputted received level difference signal ΔE, and outputs the received level difference signal ΔE9 at the detection timing to the bit generator part 902.

Moreover, in FIG. 17, the bit generator part 902 discriminates which reflector of the reflectors 5-1, 5-2, 4-3 and 4-4 the center C110-9 of the antennas 112 to 114 that configure the polarized wave information reading circuit 110-9 is located just above on the basis of the level of the inputted received level difference signal ΔE9 and the threshold values TH1a, TH2a, TH3a and TH4a of FIG. 18. Then, a predetermined bit signal S902 is generated in accordance with the discriminated reflector, and outputted to the bit position converter part 903. In concrete, when the center C110-9 is located just above the reflectors 5-1, 5-2, 4-3 and 4-4, the bit generator part 902 generates a bit signal S902 that includes bit data "01", "10", "00" and "11", respectively.

Further, referring to FIG. 17, the bit position converter part 903 preparatorily stores a conversion table 903t of relations between the bit data included in the bit signal S902 and the position of the polarized wave information reading circuit 110-9. The bit position converter part 903 converts the bit data included in the inputted bit signal S902 into the position of the polarized wave information reading circuit 110-9 with reference to the conversion table 903t, and outputs the position as position data D903.

As described above, according to the present embodiment, since the reflectors 5-1, 5-2, 4-3 and 4-4 that radiate the reflected waves having the combinations of the polarization directions different from each other and reflectances different from each other provided, the position of the polarized wave information reading circuit 110-9 can be expressed by bit data of two bits. Therefore, the total length of the reflector apparatus 200D can be shortened in a manner similar to that of the sixth embodiment, and the space-saving low-cost position measurement apparatus 1E can be actualized.

Eighth Embodiment

FIG. 19 is a block diagram showing a configuration of a polarized wave information reading circuit 110B according to the eighth embodiment of the present invention. In FIG. 19, the polarized wave information reading circuit 110B is configured to include a transmitter part 111B including oscillators 1003 and 1004, transceiving antennas 1001 and 1002, and a receiver part 115 including a received level difference calculator 305. In FIG. 19, a polarization direction P1001 of radio waves that are transmitted or received by the transceiving antenna 1001 and a polarization direction P1002 of radio waves that are transmitted or received by the transceiving antenna 1002 are set to be perpendicular to each other. In concrete, the polarization direction P1001 is set to +45 degrees, and the polarization direction P1002 is set to −45 degrees.

Moreover, in FIG. 19, the oscillator 1003 generates an oscillation signal S1001 having a predetermined frequency, and outputs the oscillation signal S1001 to the feeding point Q1 of the transceiving antenna 1001. The transceiving antenna 1001 radiates the oscillation signal S1001 as linearly polarized radio waves having the polarization direction P1001. Moreover, the transceiving antenna 1001 receives reflected waves having the polarization direction P1001, and outputs the received waves as a received signal E1001 to the non-inverted input terminal of the received level difference calculator 305.

Further, referring to FIG. 19, the oscillator 1004 generates an oscillation signal S 1002 having a frequency identical to that of the oscillation signal S1001, and outputs the oscillation signal S1002 to the feeding point Q2 of the transceiving antenna 1002. The transceiving antenna 1002 radiates the oscillation signal S1002 as linearly polarized radio waves having the polarization direction P1002. Moreover, the transceiving antenna 1002 receives reflected waves having the polarization direction P1002, and outputs the same as a received signal E1002 to the inverted input terminal of the received level difference calculator 305. Then, an output signal from the received level difference calculator 305 is outputted as a received level difference signal ΔEb to the position calculator circuit 120.

As described above, according to the present embodiment, since the transmitting antenna 112 and the receiving antenna 113 are shared and the transmitting antenna 112 and receiving antenna 114 are shared by comparison to each of the aforementioned embodiments, a position measurement apparatus of a smaller size can be actualized. Moreover, the polarization direction of the reflected waves reflected from the transceiving antenna 1001, the polarization direction of the radio waves reflected by the reflector apparatus 200 and the polarization direction of the radio waves radiated from the transceiving antenna 1001 are made to coincide with one another, and the polarization direction of the radio waves radiated from the transceiving antenna 1002, the polarization direction of the reflected wave reflected by the reflector apparatus 200 and the polarization direction of the radio wave received by the transceiving antenna 2001 are made to coincide with one another. Therefore, the level of each of the received signals E1001 and E1002 can be increased by comparison to each of the aforementioned embodiments. Therefore, the signal-to-noise ratio of the received level difference signal ΔEb is improved, and the position of the mobile object can be detected more accurately by comparison to each of the aforementioned embodiments.

In FIG. 19, the oscillator 1003 and the oscillator 1004 may be replaced with one oscillator.

Moreover, the polarized wave information reading circuit 110A of the fifth embodiment or the polarized wave information reading circuit 110B of the eighth embodiment may be used in place of the polarized wave information reading circuits 110, and 110-1 to 110-9.

Further, although the reflectors 2-1 to 2-12, the reflectors 3-1 to 3-12, the reflectors 4-1 to 4-4, and the reflectors 5-1 to 5-2 and 4-3 to 4-4 are arranged linearly in the aforementioned embodiments, the present invention is not limited to this, and it is preferable to arrange them along a predetermined transfer pathway of the mobile object. Moreover, although the transfer pathway of the mobile object is a straight line along the x axis in each of the aforementioned embodiments, the present invention is not limited to this, and it may be a curved line.

Moreover, although the received level difference signals ΔE, ΔE1 to ΔE9, ΔEa and ΔEb are used as the polarization state signals in the aforementioned embodiments, the present invention is not limited to this, and it is acceptable to use the received signals E1, E2, E1a, E1b, E1001 or E1002 as polarization state signals.

INDUSTRIAL APPLICABILITY

As described above, according to the position measurement apparatus of the present invention, which uses radio waves, the relative position of the mobile object such as a train and an elevator cage can be measured without receiving dirt and dust and the influence of environmental changes such as turbulence light. Moreover, since the interval between the position detecting means and the reflecting means may be a half of the reflector interval, an interval between the position detecting means and the reflecting means can be set to several tens of centimeters when the reflector interval is set to 30 cm, and the position of the mobile object such as a train and an elevator cage can be measured. Further, since the position of the position detecting means is measured on the basis of the polarization detection of the reflected waves instead of the reflection intensity of the reflected waves, a change in the polarization state signal corresponding to a change in the polarization direction of the reflected waves can be detected without receiving the influences of metal objects around the position measurement apparatus, the movement of the mobile object, and the phase interference due to multipath reflection, and the position of the mobile object such as a train and an elevator cage can be measured more accurately than that of the prior art.

REFERENCE NUMERALS 1, 1A, 1B, 1C, 1D, 1E: Position measurement apparatus; 2-1 to 2-12, 3-1 to 3-12, 4-1 to 4-4, 5-1, 5-2: Reflector; 100, 100A, 100B, 100C, 100D, 100E: Position detector apparatus; 110, 110A, 100B, 110-1 to 110-9: Polarized wave information reading circuit; 111, 111A: Transmitter part; 112: Transmitting antenna; 113: Receiving antenna; 114: Receiving antenna; 115, 115A: Receiver part; 120, 120A, 120B, 120C, 120D, 120E: Position calculator circuit; 121: Counter circuit; 200, 200A, 200B, 200C, 200D: Reflector apparatus; 201: Resin plate; 301: Oscillator; 305: Received level difference calculator; 401: Arctangent calculator part; 402: Counter circuit; 403: Angular position converter; 404, 603: Adder; 501, 802, 902: Bit generator part; 502, 803, 903: Bit position converter part; 601, 602: Polarized wave information reading circuit group; 604, 605, 804, 805: Reflector group; 701: Controller; 702: Pulse generator part; 703: Distance measuring part; 704: Propagation-time-classified received signal separator part; 801, 901: Detector part; 905: Reflector group

The invention claimed is:

1. A position measurement apparatus comprising:
reflecting means having a plurality of reflectors, that are configured to be arranged at a predetermined reflector interval along a predetermined transfer pathway of a mobile object, and to radiate radio waves by reflecting reflected waves in respective predetermined polarization directions when predetermined radio waves are incident thereon; and
position detecting means configured to detect a position of the mobile object in the transfer pathway,
wherein the position detecting means comprises:
at least one polarized wave information reading means configured to radiate the radio waves from the mobile object toward the reflecting means, receive a reflected wave from the reflecting means, and generate a polarization state signal corresponding to the polarization direction of the received reflected wave; and
position calculating means configured to calculate the position of the mobile object on the transfer pathway, on the basis of at least one polarization state signal from at least one of the polarized wave information reading means.

2. The position measurement apparatus as claimed in claim 1,
wherein the plurality of reflectors of the reflecting means are provided so that the polarization directions of reflected waves from each pair of reflectors adjacent to each other become different from each other,
wherein the position detecting means comprises one polarized wave information reading means, and
wherein the position calculating means calculates a relative position of the mobile object on the transfer pathway with respect to a predetermined reference position, on the basis of a change in the polarization state signal from the one polarized wave information reading means.

3. The position measurement apparatus as claimed in claim 1,
wherein the plurality of reflectors of the reflecting means are provided so that the polarization directions of the reflected waves from each pair of reflectors adjacent to each other become different from each other,
wherein the position detecting means comprises two polarized wave information reading means provided mutually at a predetermined interval, and
wherein the position calculating means calculates a relative position of the mobile object on the transfer pathway with respect to the predetermined reference position between the reflectors, on the basis of a change in the two polarization state signals from the two polarized wave information reading means.

4. The position measurement apparatus as claimed in claim 3,
wherein an interval between the two polarized wave information reading means is set to an interval obtained by multiplying the reflector interval by a value, which is obtained by dividing a predetermined positive odd number by two, and
wherein the position calculating means calculates the relative position of the mobile object between the reflectors, on the basis of an arctangent value of the two polarization state signals.

5. The position measurement apparatus as claimed in claim 1,
wherein the radio waves are linearly polarized radio waves having a predetermined polarization direction perpendicular to the transfer pathway of the mobile object, and
wherein each of the plurality of reflectors reflects and radiates incident radio waves with a polarization direction changed from the polarization direction of linearly polarized radio waves by one of +45 degrees and −45 degrees.

6. The position measurement apparatus as claimed in claim 1,
wherein each of the polarized wave information reading means separates a once-reflected wave reflected only once by the reflecting means from the received reflected waves, and generates the polarization state signal, on the basis of the separated once-reflected wave.

7. The position measurement apparatus as claimed in claim 1,
wherein the plurality of reflectors comprise a first reflector group including a plurality of first reflectors arranged at the reflector interval,
wherein the plurality of first reflectors of the first reflector group are provided so that, when a plurality of M first reflectors adjacent to each other are selected from the plurality of first reflectors by sequentially shifting the plurality of M first reflectors adjacent to each other by one of the first reflectors, polarization direction patterns of first reflected waves from the selected plurality of M first reflectors become different from each other, wherein the position detecting means comprises a plurality of M polarized wave information reading means, wherein the plurality of M polarized wave information reading means are provided at an interval identical to the reflector interval, wherein each of the plurality of M polarized wave information reading means radiates the radio waves from the mobile object toward the first reflector group, receives the first reflected waves from the first reflector group, and generates a polarization state signal corresponding to the polarization direction of the received first reflected waves, and wherein the position calculating means calculates an absolute position of the mobile object on the transfer pathway, on the basis of the pattern of a plurality of M polarization state signals from the plurality of M polarized wave information reading means.

8. The position measurement apparatus as claimed in claim 7, wherein the polarization direction patterns of the first reflected waves from the plurality of first reflectors of the first reflector group are set so as to correspond to a consecutive partial code selected from a pseudo-random code.

9. The position measurement apparatus as claimed in claim 1, wherein each of the polarized wave information reading means comprises:

a transmitting antenna configured to radiate the radio waves toward the reflecting means;

a first receiving antenna configured to receive reflected waves in a predetermined first polarization direction;

a second receiving antenna configured to receive reflected waves in a predetermined second polarization direction different from the first polarization direction; and receiving means configured to generate a received level difference signal representing a difference between a level of the first received signal received by the first receiving antenna and a level of the second received signal received by the second receiving antenna as the polarization state signal, and wherein the transmitting antenna, the first receiving antenna, and the second receiving antenna are fixed to the mobile object, and are provided so as to have a predetermined constant interval between the antennas and the reflecting means.

10. The position measurement apparatus as claimed in claim 9, wherein the constant interval is set to a half of the reflector interval.

11. The position measurement apparatus as claimed in claim 9, wherein the first polarization direction and the second polarization direction are perpendicular to each other.

12. A position measurement apparatus comprising:

a plurality of radio wave reflectors that are configured to be arranged at a predetermined reflector interval along a predetermined transfer pathway of a mobile object to radiate radio waves by reflecting reflected waves in respective predetermined polarization directions when predetermined radio waves are incident thereon; and a position detector that detects a position of the mobile object in the transfer pathway, the position detector including at least one polarized wave information reader including a transmitter that radiates the radio waves from the mobile object toward at least one of the plurality of radio wave reflectors, a receiver that receives a reflected wave from at least one of the plurality of radio wave reflectors and generates a polarization state signal corresponding to the polarization direction of the received reflected wave, and a calculator that calculates the position of the mobile object on the transfer pathway on the basis of at least one polarization state signal from the at least one polarized wave information reader.

* * * * *

UNITED STATES PATENT AND TRADEMARK OFFICE
CERTIFICATE OF CORRECTION

| | | |
|---|---|---|
| PATENT NO. | : 9,488,500 B2 | Page 1 of 1 |
| APPLICATION NO. | : 14/111012 | |
| DATED | : November 8, 2016 | |
| INVENTOR(S) | : Tsujita et al. | |

It is certified that error appears in the above-identified patent and that said Letters Patent is hereby corrected as shown below:

On the Title Page

Item (54) and in the Specification, Column 1 Line 1-4 the Title should read:
-- POSITION MEASUREMENT APPARATUS FOR MEASURING POSITION OF MOBILE OBJECT ON THE BASIS OF REFLECTED WAVE --

Signed and Sealed this
Tenth Day of July, 2018

Andrei Iancu
*Director of the United States Patent and Trademark Office*